US012305749B2

(12) United States Patent
Gennari et al.

(10) Patent No.: US 12,305,749 B2
(45) Date of Patent: May 20, 2025

(54) AUTOMATIC BACKLASH-COMPENSATION FOR A DOG CLUTCH IN AN ELECTRIFIED TRANSMISSION

(71) Applicant: DANA ITALIA S.R.L., Trentino (IT)

(72) Inventors: Sara Gennari, Arco (IT); Mirko Brentari, Arco (IT); Giacomo Faggiani, Rovereto (IT); Pier Paolo Rinaldi, Arco (IT)

(73) Assignee: DANA ITALIA S.R.L., Arco (IT)

( * ) Notice: Subject to any disclaimer, the term of this patent is extended or adjusted under 35 U.S.C. 154(b) by 44 days.

(21) Appl. No.: 18/492,192

(22) Filed: Oct. 23, 2023

(65) Prior Publication Data

US 2025/0129845 A1   Apr. 24, 2025

(51) Int. Cl.
*F16H 61/04* (2006.01)
*F16D 48/06* (2006.01)

(52) U.S. Cl.
CPC ....... *F16H 61/0403* (2013.01); *F16D 48/064* (2013.01); *F16H 2061/0422* (2013.01); *F16H 2061/0474* (2013.01)

(58) Field of Classification Search
CPC ......... F16H 61/0403; F16H 2061/0422; F16H 2061/0474; F16D 48/064

USPC ........................................... 74/335
See application file for complete search history.

(56) References Cited

U.S. PATENT DOCUMENTS

| | | | | |
|---|---|---|---|---|
| 6,213,916 | B1* | 4/2001 | Ning | B60W 10/11 477/174 |
| 8,041,486 | B2* | 10/2011 | Baldet | F16H 61/0403 701/64 |
| 8,235,853 | B2* | 8/2012 | Lutoslawski | B60W 10/111 475/5 |
| 9,416,874 | B2* | 8/2016 | Vu | F16D 48/06 |
| 9,989,109 | B2* | 6/2018 | Jonsson | F16D 48/06 |
| 10,066,744 | B2 | 9/2018 | Ono et al. | |
| 11,885,412 | B2* | 1/2024 | Quintero | F16H 61/04 |
| 2018/0345787 | A1* | 12/2018 | Niimi | F16D 13/52 |

FOREIGN PATENT DOCUMENTS

EP     2048401 A2    4/2009

* cited by examiner

*Primary Examiner* — Ha Dinh Ho
(74) *Attorney, Agent, or Firm* — McCoy Russell LLP

(57) ABSTRACT

A method for controlling an engagement of a dog clutch in an electrified drivetrain, comprising: locking a shaft of a transmission; positioning an actuator of the transmission at a prescribed position; commanding an electric machine to rotate at a speed; and updating the engagement threshold position when the electric machine stalls based on the prescribed position of actuator.

19 Claims, 15 Drawing Sheets

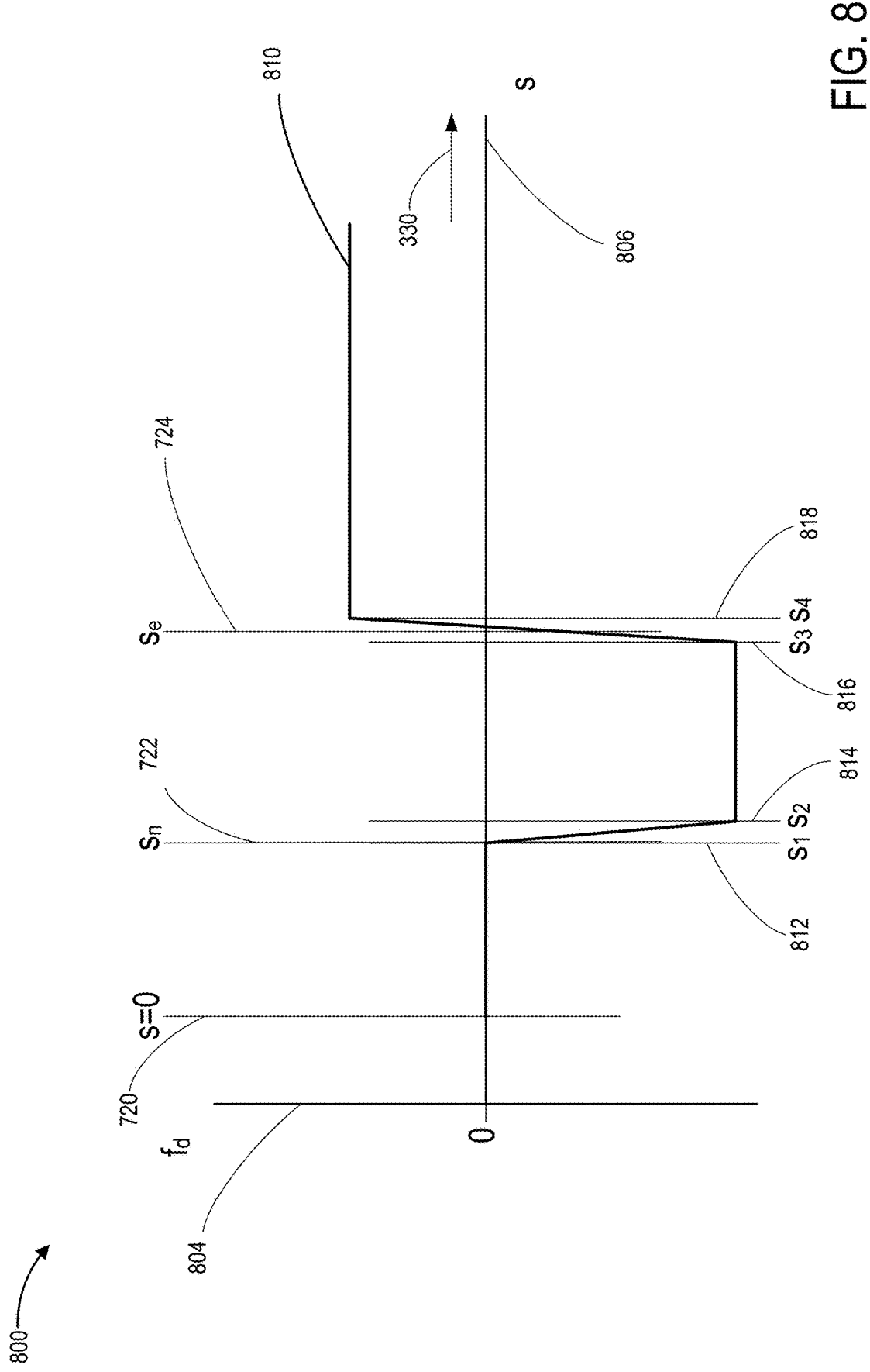

AUTOMATIC BACKLASH-COMPENSATION FOR A DOG CLUTCH IN AN ELECTRIFIED TRANSMISSION

TECHNICAL FIELD

The field relates to a control method for controlling engagement of a clutch in an electrified transmission.

BACKGROUND AND SUMMARY

Vehicles, such as electrified vehicles, may have a transmission to change gears having different ratios that produce different output torques and rotational speeds with the same input torque. An electrified vehicle may have an electric machine coupled with an input of the transmission. The transmission may comprise a gear assembly and a dog clutch actuated by an actuator shiftingly coupled to an engaging component of the clutch.

For an electrified transmission, wherein a torque input to the transmission is provided by an electric motor, dog clutches may be used in place of synchronizers to provide a desired dynamic performance.

However, operating with dog clutches may produce complications with the shifting. Components of dog clutches, such as teeth or components of gears, may experience a higher degree of grinding during engagement compared to a synchronizer. Such grinding may increase noise and vibration produced by the transmission during shifting, making a driving experience and operation of a vehicle more uncomfortable for a driver, passenger, or other users of the vehicle. Additionally, grinding may increase the wear and other forms of degradation to the teeth and other components of the clutch assembly. The grinding may also increase wear and other forms of degradation to the teeth and other components of the gears or rotational elements the clutch assembly may selectively couple. Additionally, vibrations from grinding may increase degradation to the other components, such as the gear sets and shafts, housed within the transmission.

A control method may be used to determine various position where teeth engage or disengage during a clutch operation. However, such an approach may have uncertainty due to the axial clearance to permit relative motion between the parts while preventing wear and other degradation. For example, the engagement positions may have a normal statistic distribution among different gear sets for a plurality of transmissions as to the particular engagement and disengagement positions. If a normal distribution is applied to an entire population of the transmissions, some populations of transmission may have increased chances of grinding compared to other populations. Additionally, some populations of transmission may have increased chances of missing engagements with the dog clutch. Missing engagements may increase the shifting times. While individual calibrations may reduce such issues, such calibration may add additional time to manufacturing. Special equipment may also be used to calibrate a controller, such as the ECU, the actuator, and the components of the dog clutch. Additionally, if a component of a transmission, such a component rotationally coupled to the dog clutch, becomes misaligned or is recalibrated, the approach may be less effective at engaging the dog clutch, increasing the chances of grinding and/or missing engagements.

The inventors herein have recognized these and other issues with such systems and have developed approaches to at least partially solve them. As developed in one example, a method for controlling an engagement of a dog clutch in an electrified drivetrain, comprising: locking a shaft of a transmission; positioning an actuator of the transmission at a prescribed position; commanding an electric machine to rotate at a speed; and updating the engagement threshold position when the electric machine stalls based on the prescribed position of actuator.

The method may allow for an ECU and an actuator, such a range shift actuator (RSA), to compensate automatically for degradation, backlashes, and other changes to the clutch system, therein improving the accuracy of the teeth entering the engagement zone before and during engagement. Improving the accuracy of engagement may reduce grinding during engagement or missing engagement of the first teeth and second teeth of the dog clutch. The gap between the first teeth and second teeth may be reduced during the engagement phase, such that engagement may occur closer to the engagement threshold position relative to the first teeth and each of the second teeth. The actuator may not use special equipment during calibrate the positions, such as a disengaged position, for the dog clutch and the actuator. Likewise, special equipment may not be used to individually calibrate the algorithm and methods working in conjunction with the algorithm on a controller, such as the ECU.

In an example, a dedicated end-of-line device may be used to lock the transmission, wherein the output shaft may be prevented from rotating. Alternatively, a parking brake may lock the transmission and prevent the output shaft from rotating. A controller that controls the position of the actuator and the position of the components of the dog clutch, may use the approach of the present disclosure to automatically provide a disengaged position, the neutral position, and the engagement position of the actuator and components of the dog clutch. Automatic calibration via the controller may allow for the calibration of actuator and dog clutch to be performed at end of line. Likewise, calibration via the controller may allow for the calibration of the actuator and dog clutch to be performed when the transmission is installed in the vehicle. Automatic calibration of the actuator and dog clutch may be performed when the output shaft of a transmission is locked and prevented from rotating, such as when the parking brake is engaged.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 8 shows a graph with a trace of force vs position of an engaging sleeve tooth relative to various distances from a starting position of the sleeve tooth when disengaged.

DETAILED DESCRIPTION

Figure 1:
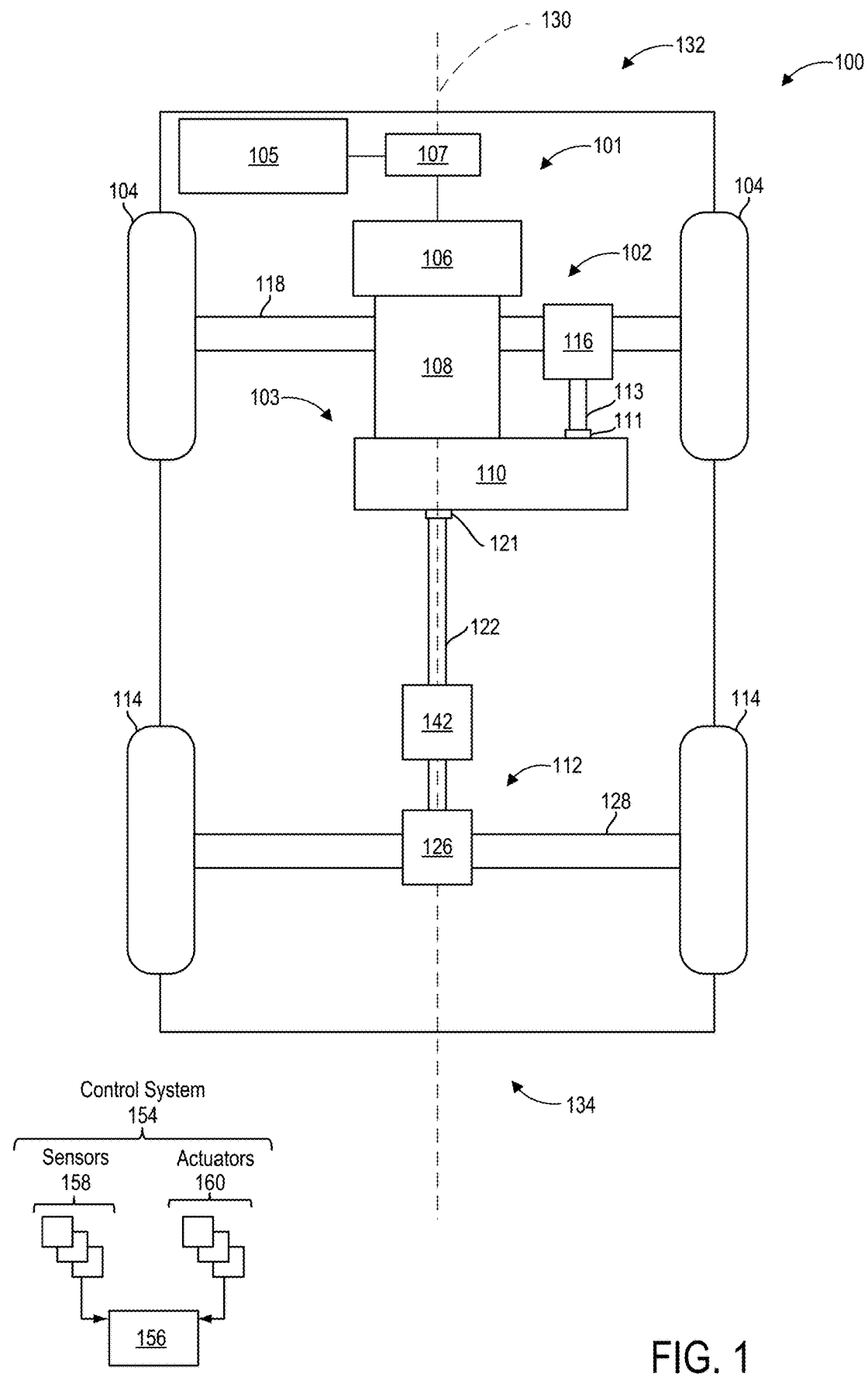
FIG. 1 shows an example schematic of a vehicle which may include the transmission of the present disclosure.

The following description relates to a method for calibrating an actuator and a clutch assembly with components shiftingly coupled to an actuator. The actuator and clutch assembly may be part of a transmission of a vehicle. The vehicle may be an electrified vehicle, wherein the vehicle has at least an electric machine as a source of rotational energy. The transmission may be an electrified transmission, such that the transmission may have at least an input from an electric machine that may transfer rotational energy via torque. The actuator may be a range shift actuator (RSA). The transmission may also comprise a gear assembly comprised of a plurality of gear sets. Each gear set may be of a different ratio and enable a different output rotational speed for the same input of rotational energy in the form of torque. The transmission may comprise at least two gear sets. At least one gear set of the gear sets may incorporate an idler gear. A controller in the form of a control unit, such as an electronic control unit (ECU), may send commands to control the actuator to shift to different positions. The control unit may control the position of the actuator to shift and by extension control the position of a clutch assembly between a plurality of phases. The control unit may operate and be used by the method to calibrate components of the clutch assembly and components responsible for actuating the clutch assembly. The clutch assembly may rotationally couple a gear of a gear set to a shaft. The gear selectively coupled to the shaft via the clutch assembly may be an idler gear for the gear set. When selectively couple to the shaft, the idler gear may be rotationally coupled to the shaft. When rotationally coupled to the shaft, the idler gear may be drivingly coupled as to transfer rotational energy via torque to the shaft. When rotationally couple to the shaft the idler gear may enable an additional and specific ratio, such that a different speed may be produced by the same input to the complementary gear set when the idler gear is rotationally coupled compared when the idler gear is not rotationally coupled to the shaft.

The clutch assembly may comprise a clutch device that is a dog clutch. The dog clutch may comprise an engaging component, such as an engaging sleeve. As an engaging sleeve, the engaging component may be an engaging ring. The dog clutch may also comprise an engagement component, such as an engagement ring. The engaging sleeve comprises at least a first tooth and may comprise plurality of first teeth. The engagement component may comprise at least a first tooth and may comprise a plurality of second teeth. The RSA may be actuated in a direction referred to as a shift direction. The shift direction may be one dimensional represented along axis. As the RSA is actuated to a first position the engaging sleeve and first tooth may be actuated to a second position complementary to and proportional with the first position on the axis. The RSA may actuate the engaging sleeve and first tooth to a plurality of positions. When the clutch is in a start position, a first tooth of the engaging sleeve may not make contact with a second tooth of an engagement component. When in a neutral threshold position, the first tooth and second tooth may make contact but not lock. When in an engaged position, such as at an engaged threshold position, the first tooth and the second tooth may make contact and may lock, such that the engaging sleeve may engage with the engagement component.

The method may be an algorithm and a search method. The method searches for a position at the start of a repulsive zone and at the end of a neutral zone, referred to herein as a neutral threshold position. Additionally, the method searches for a position between a repulsive zone and an attractive zone where the attractive zone starts, referred to herein as an engagement threshold position. Using the method, the engagement threshold position is identified. The engagement threshold position may be used by the control unit to calibrate an engagement position for to be positioned at via an actuator, such as an RSA. The method may use a plurality of heuristics methods. For an example, a first embodiment of the method may be a linear method. For the linear version of the method, each iteration the new candidate position is monotonically increased by a predetermined step. For another example, a second embodiment of the method may be a binary search method. For the binary version of the method, each iteration the range position is halved by setting the new candidate position to the midpoint. For example, a value of S1 the last tested position at which RSA is not moving, and a value S2 the last tested position at which RSA is moving. The new candidate position is S3=(S1+S2)/2. If at S3, the RSA is not moving, then in the next iteration S1 will be set to S3. If at S3, the RSA is moving in the next iteration S2 will be set to S3.

The method may search positions for each first tooth of the first teeth and each second tooth of the second teeth, such as the neutral position and the engagement position. The method may be divided into three phases: a first phase for preparing the engaging component and engagement component for engagement, a second phase for searching for the neutral threshold position, and a third phase for searching for the engagement threshold position. The second phase may also search for the end of a neutral zone and beginning of a repulsive zone defined by the neutral threshold position. The third phase may also search for the end of the repulsive zone and the start of an attractive zone defined by the engagement threshold position. When searching for the neutral threshold position and/or the engagement threshold position the first tooth may be positioned at distances away relative to a disengaged position to positions about the second tooth.

During the preparation phase the clearance for the engaging component and shift fork is minimized and the clearance for the engagement component and driven shaft is minimized. The electric machine has a null speed and torque and driven shaft of the transmission is locked. The driven shaft may be locked via a dedicated device at the end-of-line or by engaging a parking brake. The dog clutch is positioned in a neutral position, referred to herein as SO. The clearance between the engaging component and shift fork may be minimized via a shifting force from actuating the RSA. When the clearance between the engagement component and driven shaft is minimized, the clearance between the idler gear and a complementary shoulder to the idler gear is minimized. The engagement component is rotational coupled to the idler gear. The shoulder is of a groove the idler gear is fit to when positioned about the shaft. Minimizing the clearance of the engaging component and the shift fork, may minimize backlash when engaging the clutch and searching for engagement positions. Likewise, minimizing the clearance of the engagement component and the shaft, may minimize backlash when engaging the clutch and searching for engagement positions. The helix angles of the teeth of the idler gear may be used with a torque for minimization of the clearance between the gear and shoulder may use when in mesh. For example, the electric machine may be driven to a set speed and produce a constant torque. The torque may be transferred to a gear set comprising the gear. The helix angle of each tooth of the gear may cause a portion of a tangential force produced by the torque and rotation to be transferred and directed as an axial force. The helix angles are and may alternatively be referred to as helical angles. The axial force may act on the gear, pushing the gear in an axial direction. The axial force may push the gear toward the shoulder while rotating. As the gear is pushed closer to the shoulder, the clearance between the gear and shoulder is minimized. Likewise, the clearance between the engagement component and the shaft may be minimized, as the engagement component may be physically coupled to the gear and the shaft includes the shoulder as a feature. After this operation the motor is stopped (null torque and speed). The gear is a gear that may be engaged via the actuator and an engaging component, such as via the engaging component locking with the engagement component. The clearances minimized as described above may be clearances that are in a direction with reference to the shoulder on an axis. The actuator may be shifted in a same direction along and with respect to an axis when minimizing the clearances. The actuator may shift in the same direction along and with respect to the axis for the other phases of the method described below. The positions the actuator shifts to may be represented as points on an axis. The applied speed profile and magnitude can differ according to the transmission design, however the goal to achieve is to minimize the clearance.

During the second phase, the first tooth may be positioned in a plurality of zones, such as a no contact zone, a repulsive zone, or an attractive zone while the method searches for the neutral position and engagement position for the engaging component and first tooth to be positioned relative to the second tooth. Each of the zones may correspond with a different event that may occur for the engaging component and first tooth. When the engaging component is in the no contact zone, a first event may occur where the first tooth and second tooth are not touching, and the RSA is not moved. When the engaging component is in the repulsive zone, an axial force may be transferred to the engaging component from an engagement component, such as an engagement ring. The axial force may be greater than and opposite to the force of the RSA. The axial force from the engaging component may be a portion of and derived from a tangential force on the engagement component. The axial force may be transferred to push on the engaging component when the engaging component makes surface sharing contact with the engagement component. The tangential force may be derived from the transfer of torque to the engagement component, wherein the torque is generated from the output of an electric machine, such as an electric motor. In the repulsive zone, when the first tooth and second tooth touch, the first tooth and the engaging component are pushed away from the second tooth and engagement component. The force from the engagement zone may push the engaging component and by extension the RSA in a direction opposite to the shift direction. Using communicatively coupled sensors at the RSA, the distance the RSA moves opposite to the shift direction may be detected by the controller unit. The detected distance change of the RSA may be used by the algorithm to adjust the neutral position, engagement position, and testing positions of the first tooth and the engaging component.

When the engaging component is in the attractive zone the clutch may engage, such that the first tooth and second tooth may lock with one another. The tangential force of the second tooth and force of the RSA may press the first tooth against the second tooth to be in surface sharing contact. The tangential force of the engagement component and the negative angle of the second tooth may lock the first tooth with the second tooth. In the attractive zone, when the first tooth and second tooth touch, the first tooth and the engaging component may lock with the second tooth and engagement component. When the controller calibrates the RSA and the clutch assembly, and the repulsive zone search is properly calculated, during the search for the repulsive zone the third event may not occur. For an example, the axial force may be transferred to pull on the engaging component when the engaging component makes surface sharing contact with the engagement component.

Whether the first, second, or third event occurs, the electric machine is commanded to a rotational speed of zero and the RSA is moved back to a rest position, e.g., SO position. Disengagement of the first tooth and second tooth, and by extension the engaging component and engagement component, is performed if the third event occurs. Once the engaging component is moved back to SO, the clearances of the engaging component and engagement component are minimized as in the first phase, and the second phase is repeated for a new candidate position. The second phase may be repeated. The control unit may perform the detection and stop the electric machine below a minimum threshold of time, such that grinding, wearing, noise, and other forms of degradation are minimized during the second phase. Each new test position is selected via the linear search method of the first embodiment or the binary search method of the second embodiment. The minimum distance between the two candidates is below a first minimum threshold of distance dependent upon the last measurement. The iterations may continue until the difference between the greater position and the lower position is equal to or lower than a second minimum threshold of distance, such as a maximum allowable tolerance or value of error.

During the third phase, the first tooth and by extension the engaging component may be positioned in a plurality of zones, such as the repulsive zone or the attractive zone described above. During the third phase, the first event may not occur, as the neutral threshold position becomes the lowest position of positions tested. The second event may occur when the engaging component is in the repulsive zone. During the second event, the axial force from the engagement component is transferred to the engaging component. The axial force is opposite to the shift direction and may push the engaging components, such as to push back the RSA in a direction opposite to the shift direction and away from the engagement component. The second event may cause grinding of the first tooth and second tooth, and by extension the gear of the clutch. The third event may occur when the engaging component is in the attractive zone. When the engaging component is in the attractive zone, the clutch engages. The tangential force of the engagement component and the negative angle of the second tooth may lock the first tooth with the second tooth, therein locking the engaging component to the engagement component. The electric motor may be stalled and the condition of locking of the engaging component and engagement component is recorded by the controller unit.

Whether the second or third event occurs, the electric machine is commanded to a rotational speed of zero and the RSA is moved back to a rest position, e.g., SO position. Once moved back to SO, the clearances of the engaging component and engagement component are minimized as in the first phase, and the third phase is repeated for a new candidate position. The third phase may be repeated. The control unit may perform the detection and stop the electric machine below a minimum threshold of time, such that grinding, wearing, noise, and other forms of degradation are minimized during the third phase. Each new test position is selected via the linear search method of the first embodiment or the binary search method of the second embodiment. The minimum distance between the two candidates is below a first minimum threshold of distance dependent upon the last measurement. The iterations may continue until the difference between the greater position and the lower position is equal to or lower than a second minimum threshold of distance, such as a maximum allowable tolerance or value of error.

During operations of the clutch, the control unit may be programmed to set the RSA and by extension the engaging component at a neutral position when the clutch is not engaged and an engaged position when engaged. The neutral position may be as close to the neutral threshold position while in the no-contact zone. Alternative the neutral position may be the starting neutral position at the start of the method to find the engagement position. The engagement position may be as close to the neutral threshold position while being in the attractive zone. Arranging the neutral position and the engagement position as described above reduces the distance of actuation to a minimum when engaging the clutch. The procedure closes the clutch in the same direction, wherein the engaging component moves in a shift direction (e.g. an s direction) along an axis to engage with an engagement component.

Figure 2:
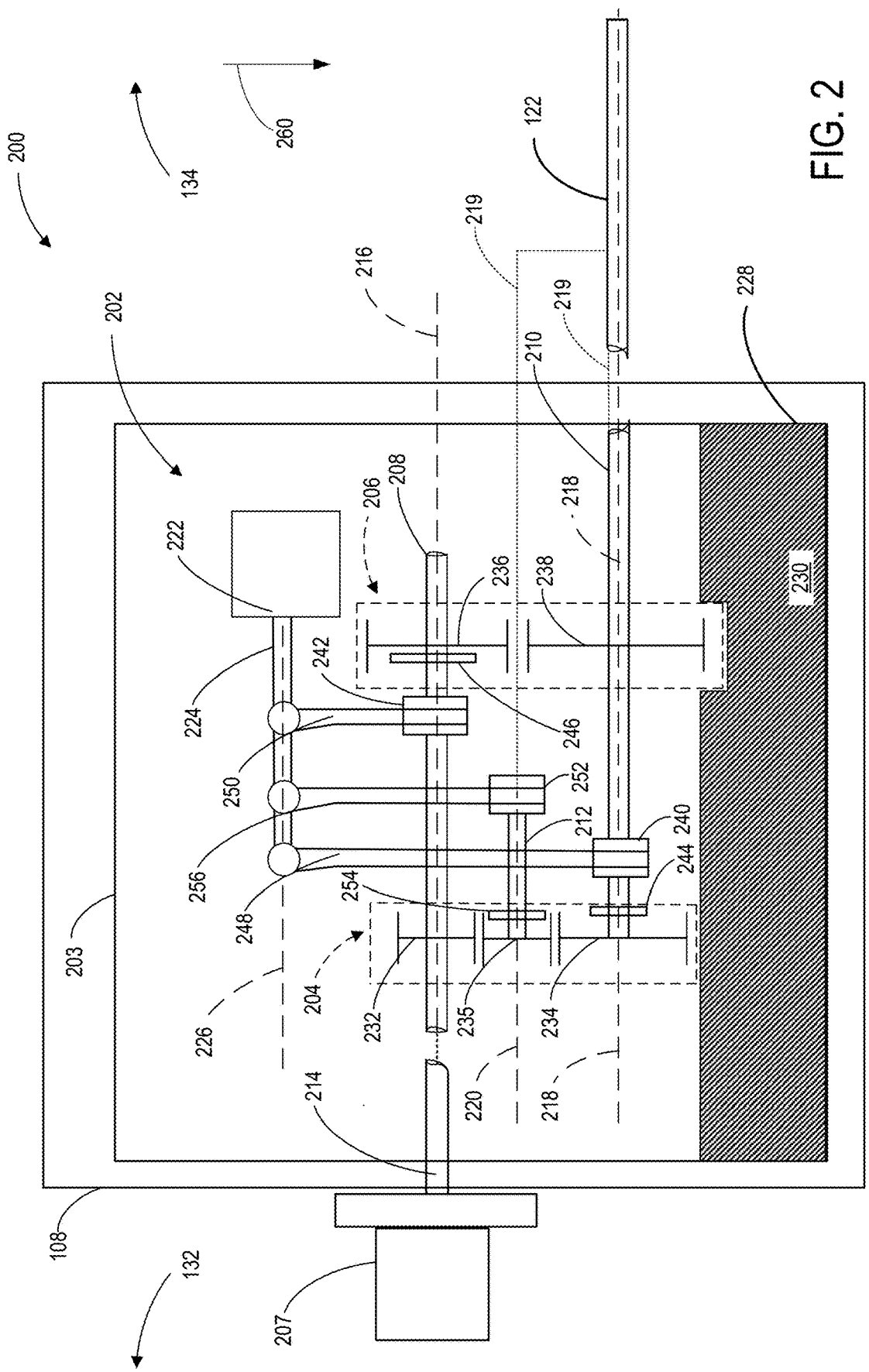
FIG. 2 shows a schematic representation of a gear assembly of the transmission which may include a clutch of the present disclosure.
Figure 3:
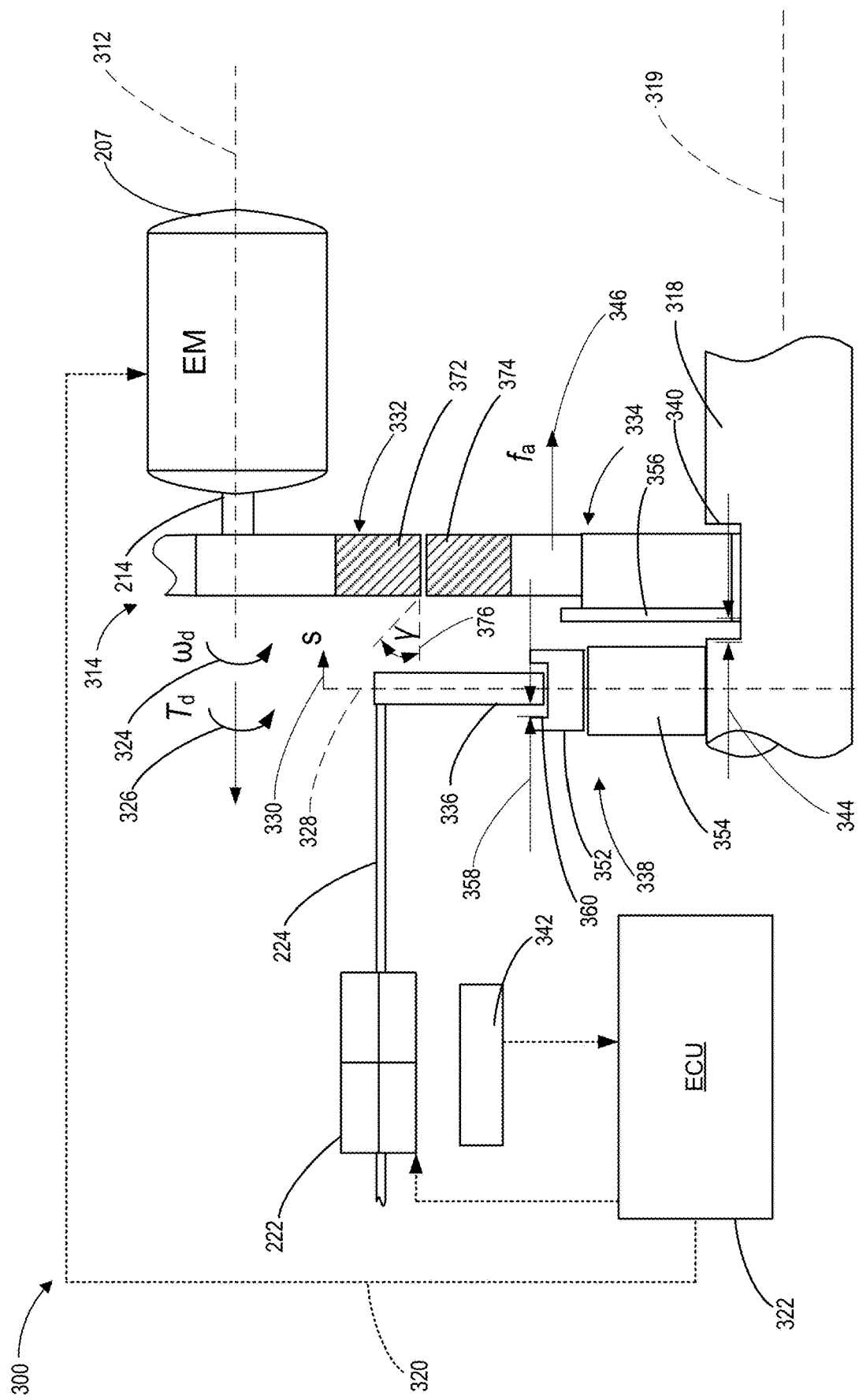
FIG. 3 show a schematic representation of a clutch system.
Figure 4:
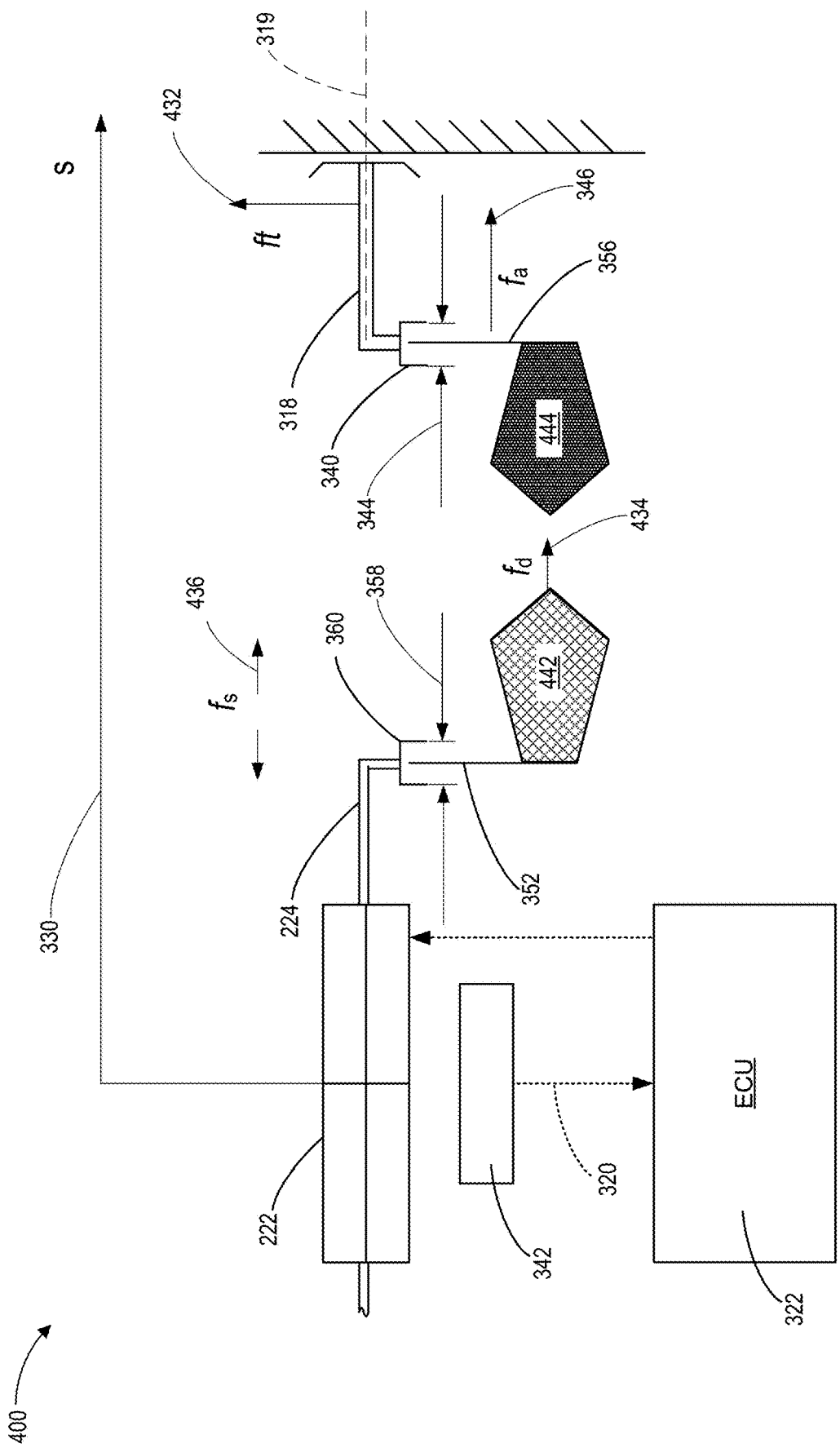
FIG. 4 shows a schematic representation of an element model of the clutch system including a simplified representation of the teeth and forces.
Figure 5A:
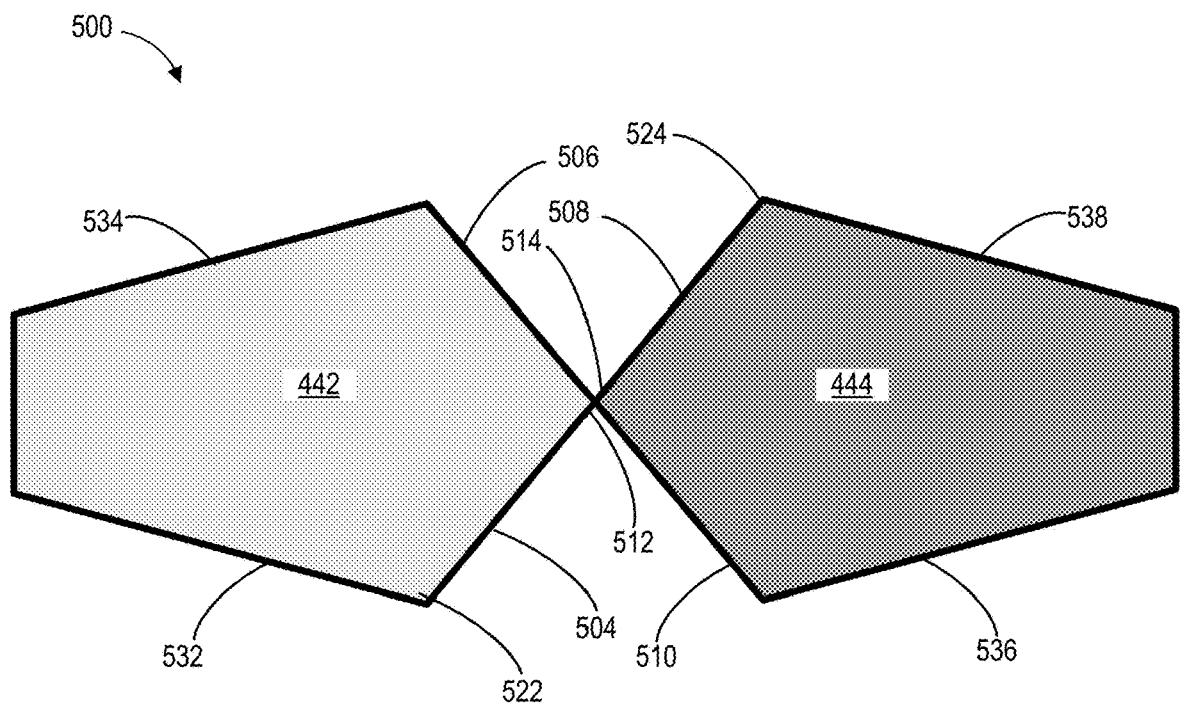
FIG. 5A shows a schematic representation of a neutral position for a first tooth and a second tooth to engage.
Figure 5B:
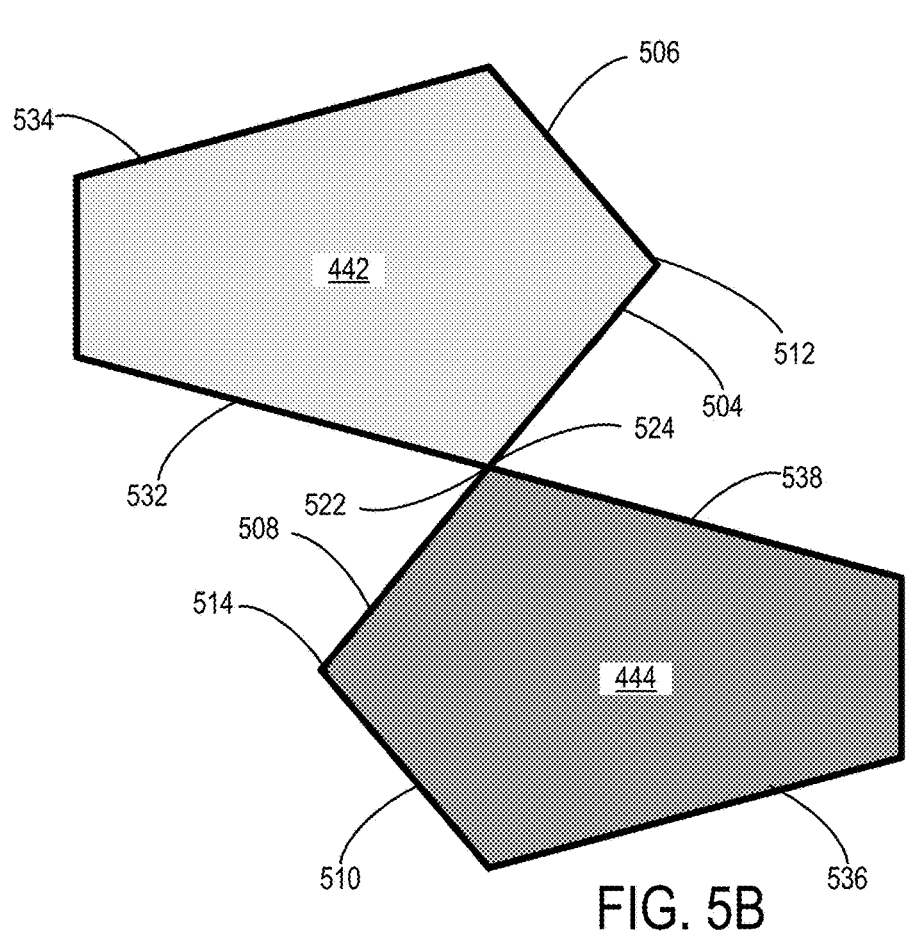
FIG. 5B shows a schematic representation of an engagement threshold position for a first tooth and a second tooth to engage.
Figure 6:
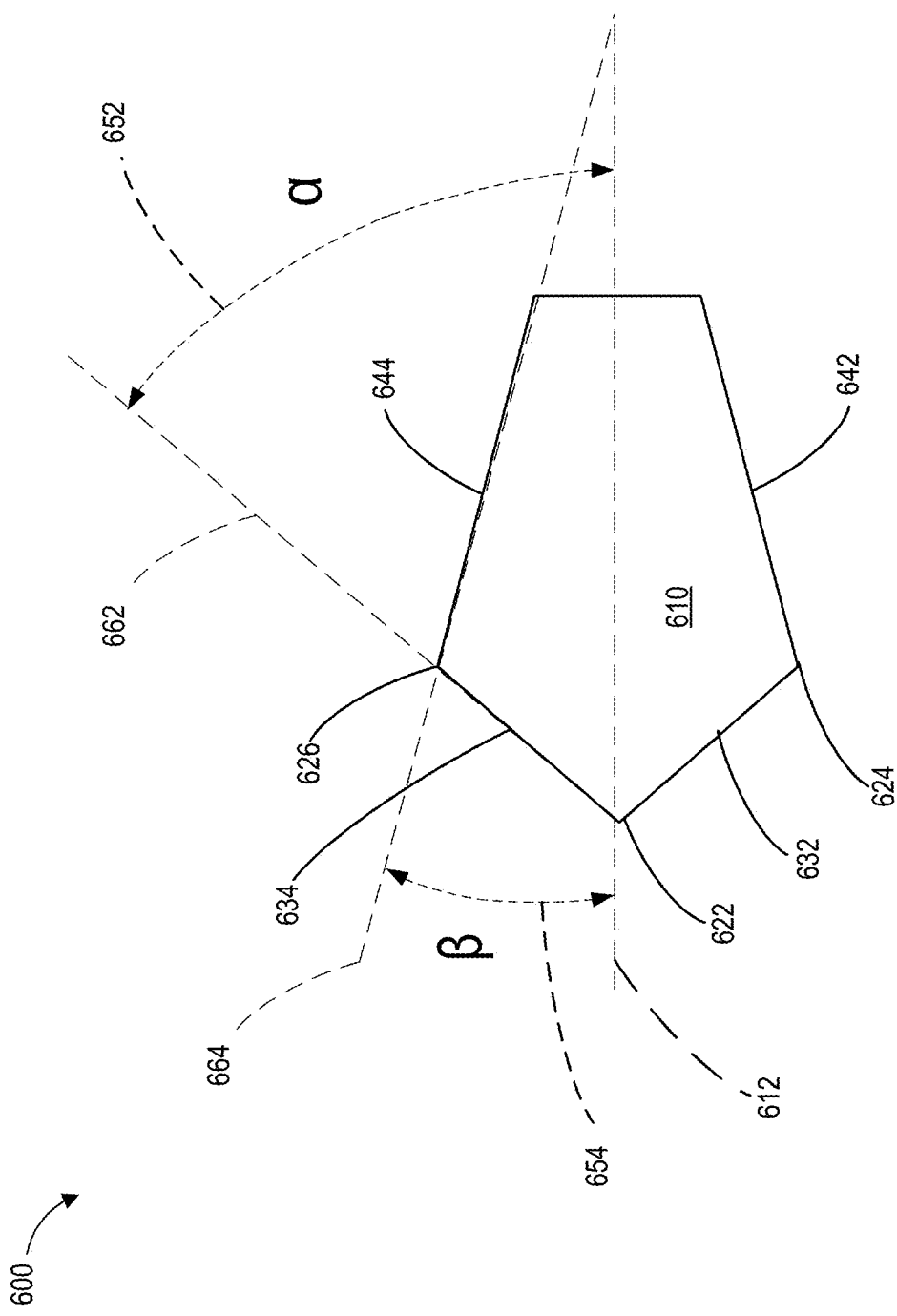
FIG. 6 shows a schematic of a tooth, including the angles and their complementary surfaces.
Figure 7:
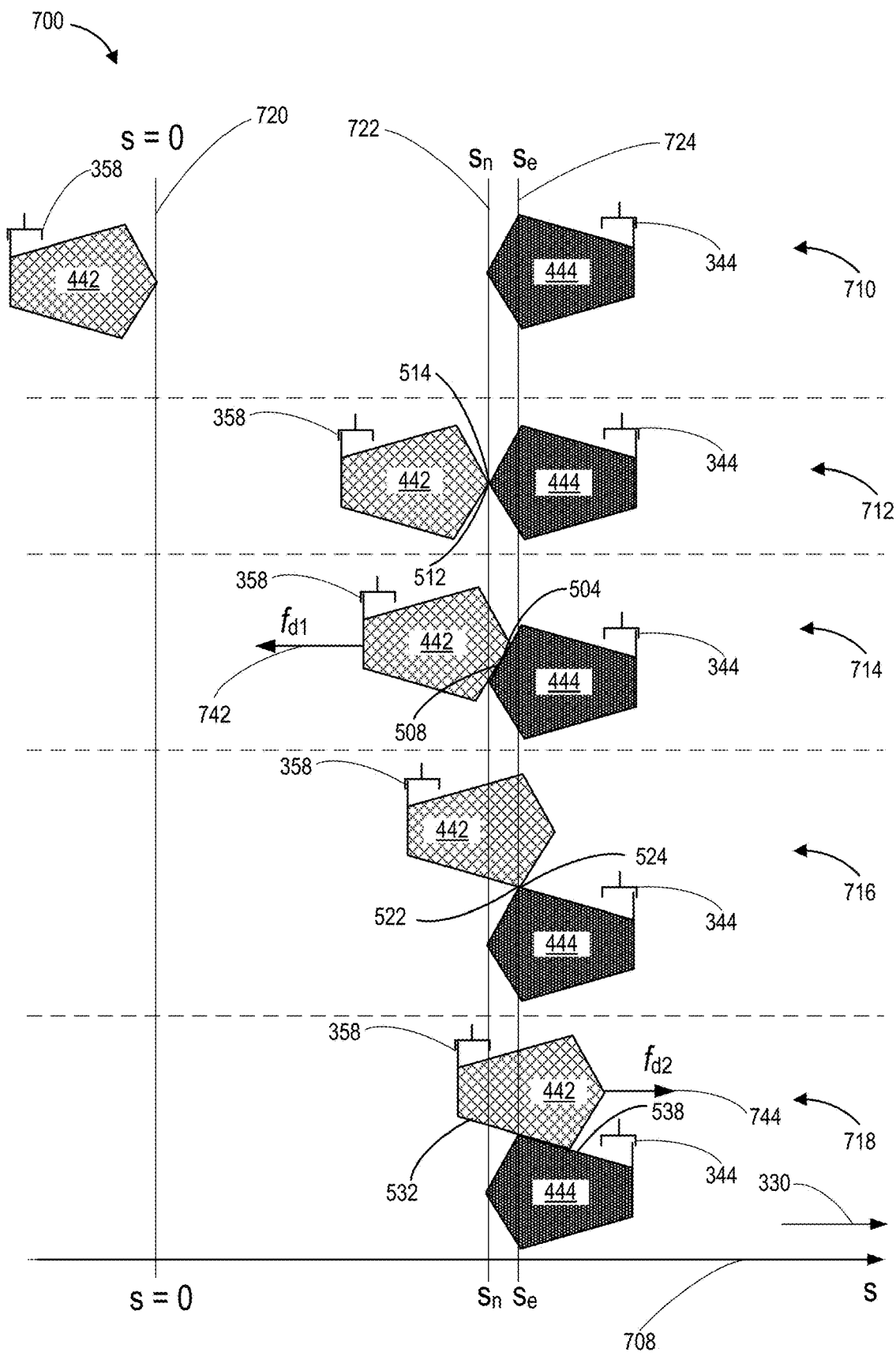
FIG. 7 shows a plurality of schematics of the first tooth and second tooth in a plurality of positions relative to distances(s) on an axis.
Figure 9A:
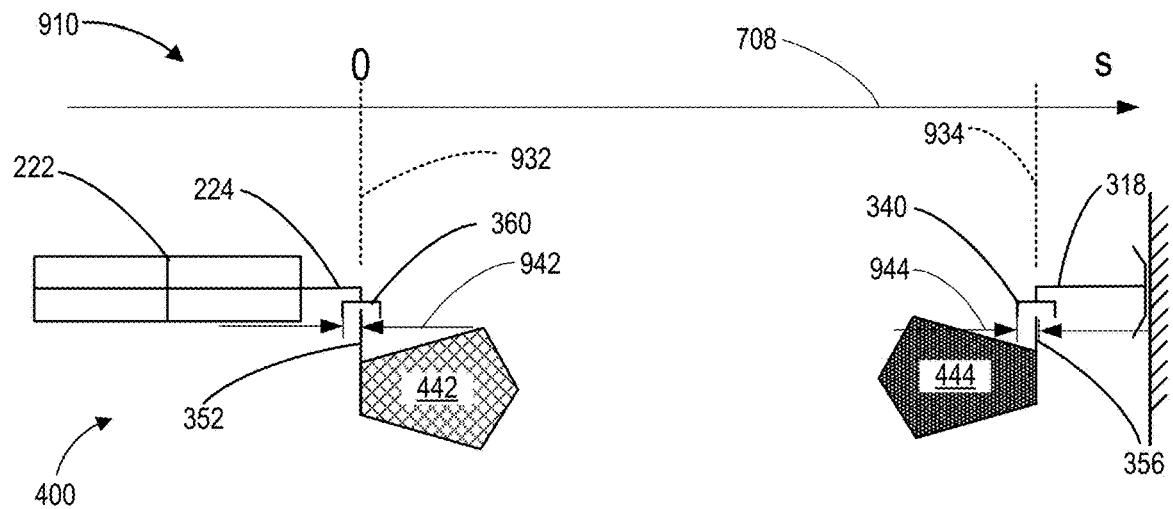
FIG. 9A shows a first position of components of the element model, including the teeth and their respective sleeves and engagement rings, during a first phase.
Figure 9B:
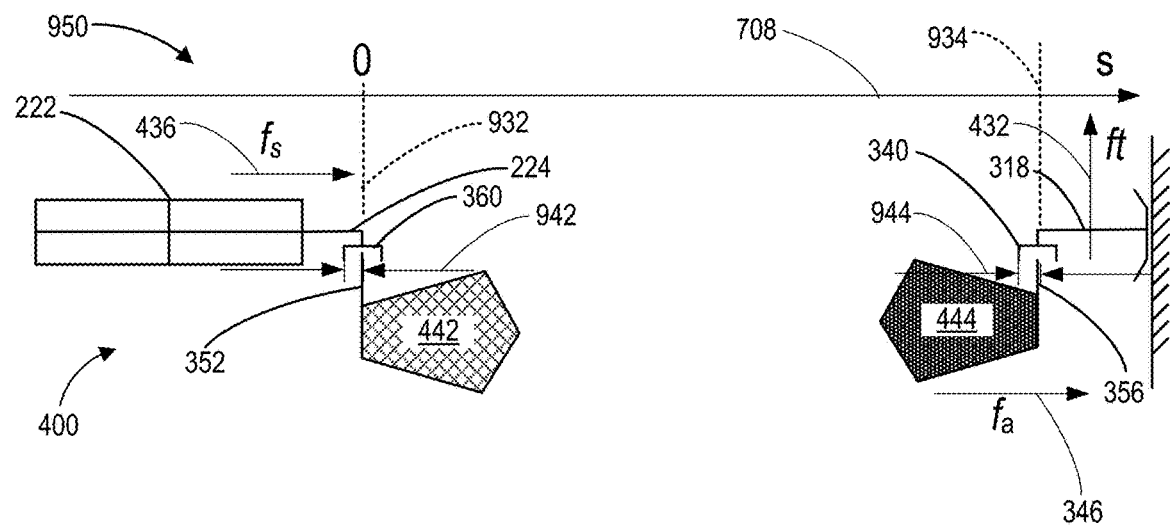
FIG. 9B shows a second position of components of the elemental model including the teeth and their respective sleeves and engagement rings, during a second phase.
Figure 9C:
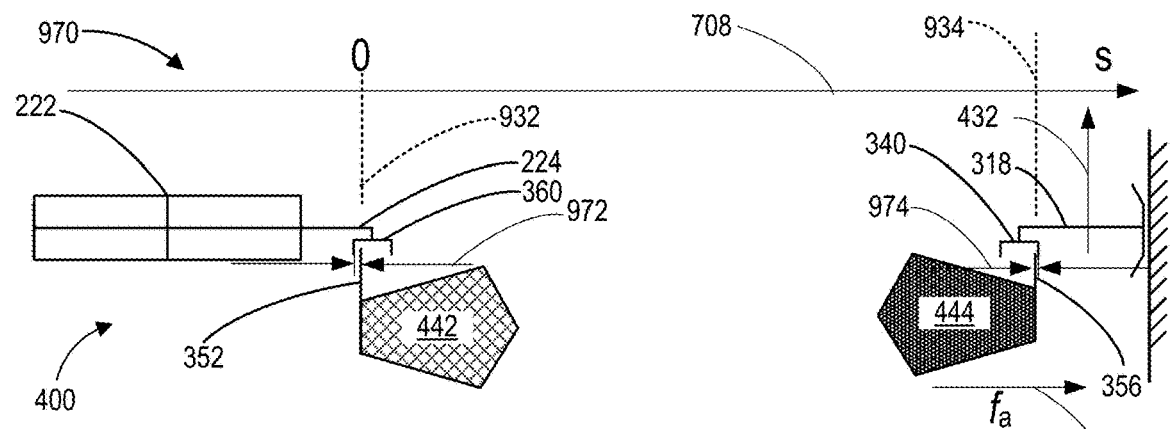
FIG. 9C shows a second position of components of the elemental model including the teeth and their respective sleeves and engagement rings, during a third phase.

FIG. 1 shows an example schematic of a vehicle which may include the transmission of the present disclosure. The vehicle in FIG. 1 may be an electrified vehicle such as a EV or a hybrid vehicle with multiple sources of torque that may include an electric motor, a hydrogen fuel cell, and/or an internal combustion engine (ICE). FIG. 1 shows an example schematic of a vehicle which may include the transmission of the present disclosure. FIG. 2 shows a schematic representation of a gear assembly of the transmission which may include a clutch of the present disclosure. The clutch of the present disclosure may be used for an idler gear shown in FIG. 2. FIG. 3 shows a schematic representation of a clutch system of the present disclosure. The clutch system may comprise an engaging ring and engagement ring used to rotationally or drivingly couple the idler gear to a shaft via a complementary hub, a shifting rod, and a shift fork. FIG. 4 shows a schematic representation of an element model of the clutch system with a simplified representation of the teeth of the clutch components and forces. FIG. 4 shows a first tooth representing a plurality of teeth on the engaging ring and a second tooth represents a plurality of teeth on the engagement ring. The first tooth and second tooth are complementary as to interlock and engage with one another. FIG. 5A shows a schematic representation of a neutral threshold position for a first tooth and a second tooth to engage. FIG. 5B shows a schematic representation of an engagement threshold position for a first tooth and a second tooth to engage. When in both the neutral position and the engagement threshold position the first tooth and second tooth may be in surface sharing contact. FIG. 6 shows a schematic of a tooth, including relative geometry, such as the angles and their complementary surfaces. FIG. 7 shows a plurality of schematics of the first tooth and second tooth in a plurality of positions relative to distances(s) on a trace. FIG. 8 shows a graph with a trace of force vs position of an engagement sleeve tooth relative to various distances from a starting position of the sleeve tooth when disengaged. FIG. 9A shows a first position of components of the element model, including the teeth and their respective sleeves and engagement rings, during a first and a second step of a greater operation. FIG. 9B shows a second position of components of the elemental model including the teeth and their respective sleeves and engagement rings, during the start of a third step of a greater operation. FIG. 9C shows a second position of components of the elemental model including the teeth and their respective sleeves and engagement rings, during the end of a third step of a greater operation. The steps of FIG. 9A-9C are steps an operation that acts a preparation phase.

Figure 10:
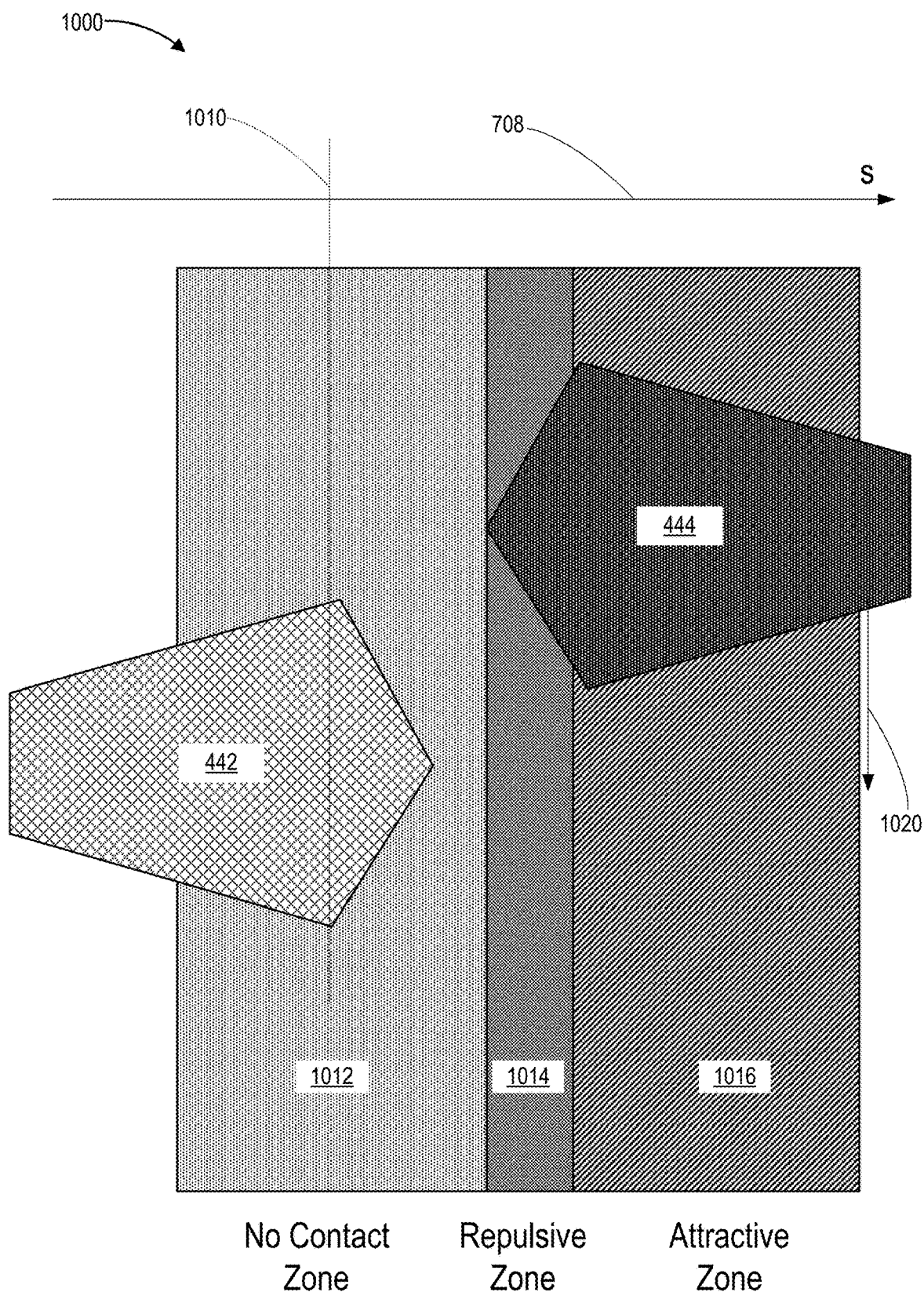
FIG. 10 shows the position of the first tooth and second tooth during a first event that may occur when searching for the repulsive zone using the algorithm.
Figure 11:
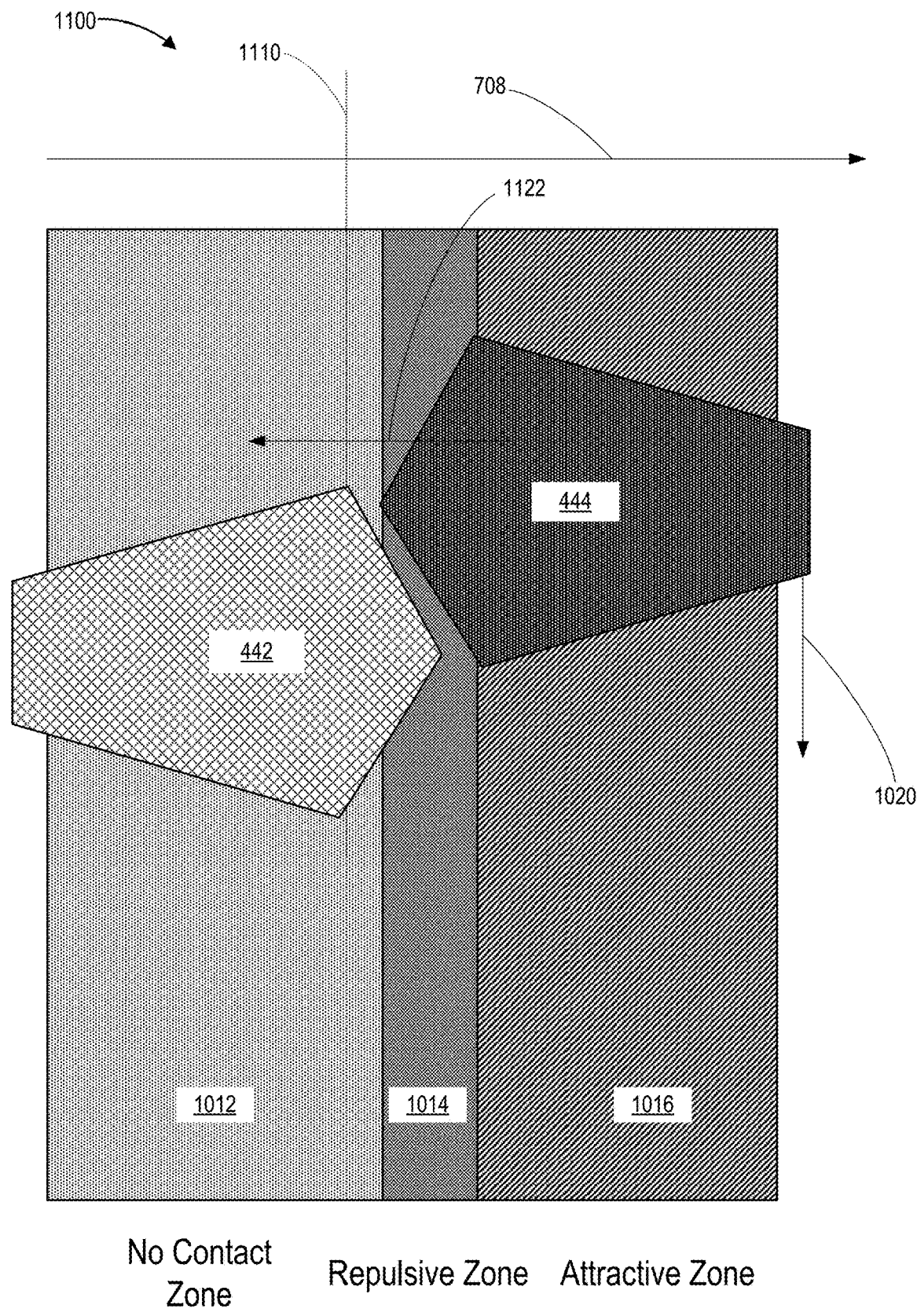
FIG. 11 shows the position of the first tooth and second tooth during a second event that may occur when searching for the repulsive zone using the algorithm.
Figure 12:
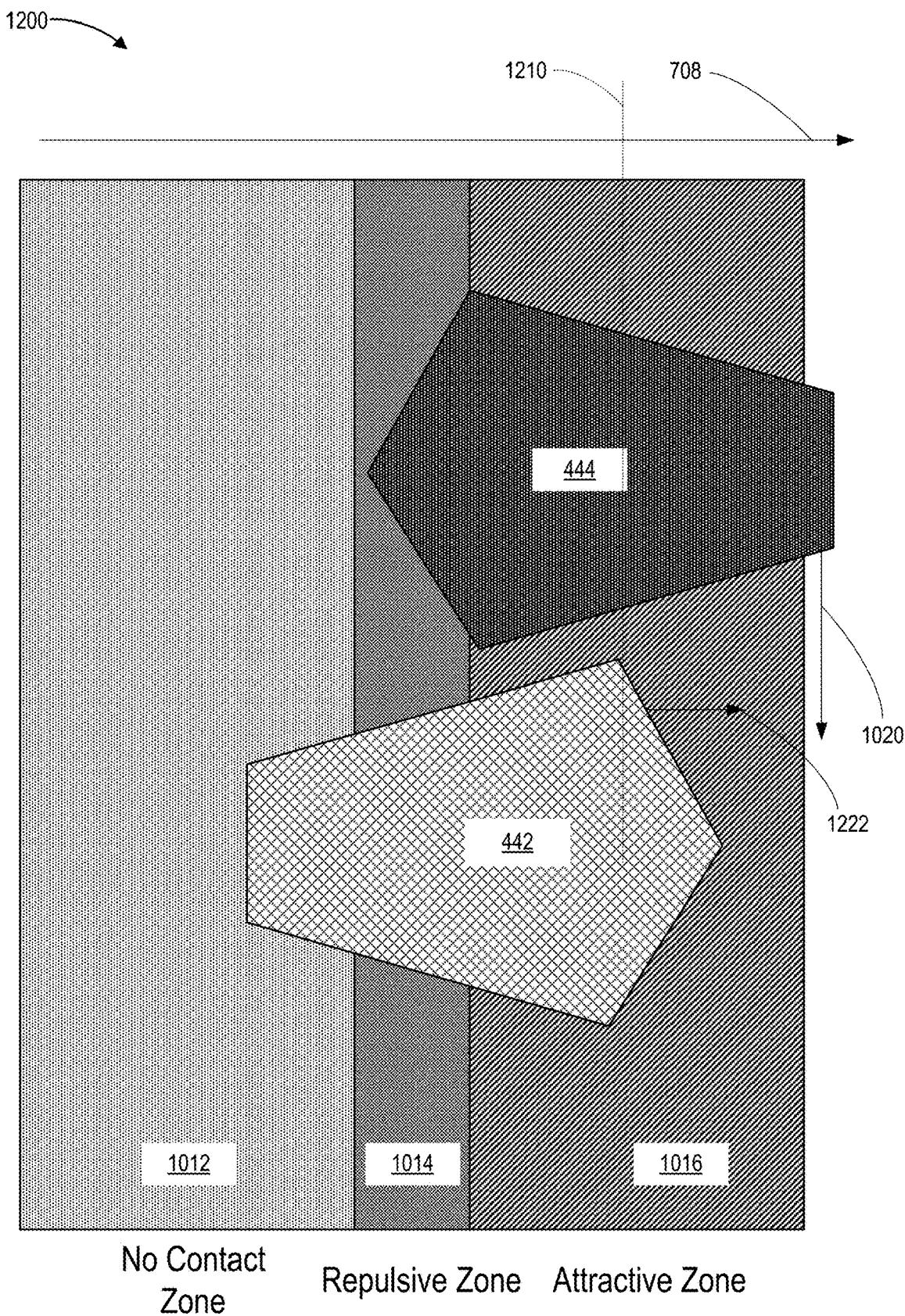
FIG. 12 shows the position of the first tooth and second tooth during a third event that may occur when searching for the repulsive zone using the algorithm.
Figure 13:
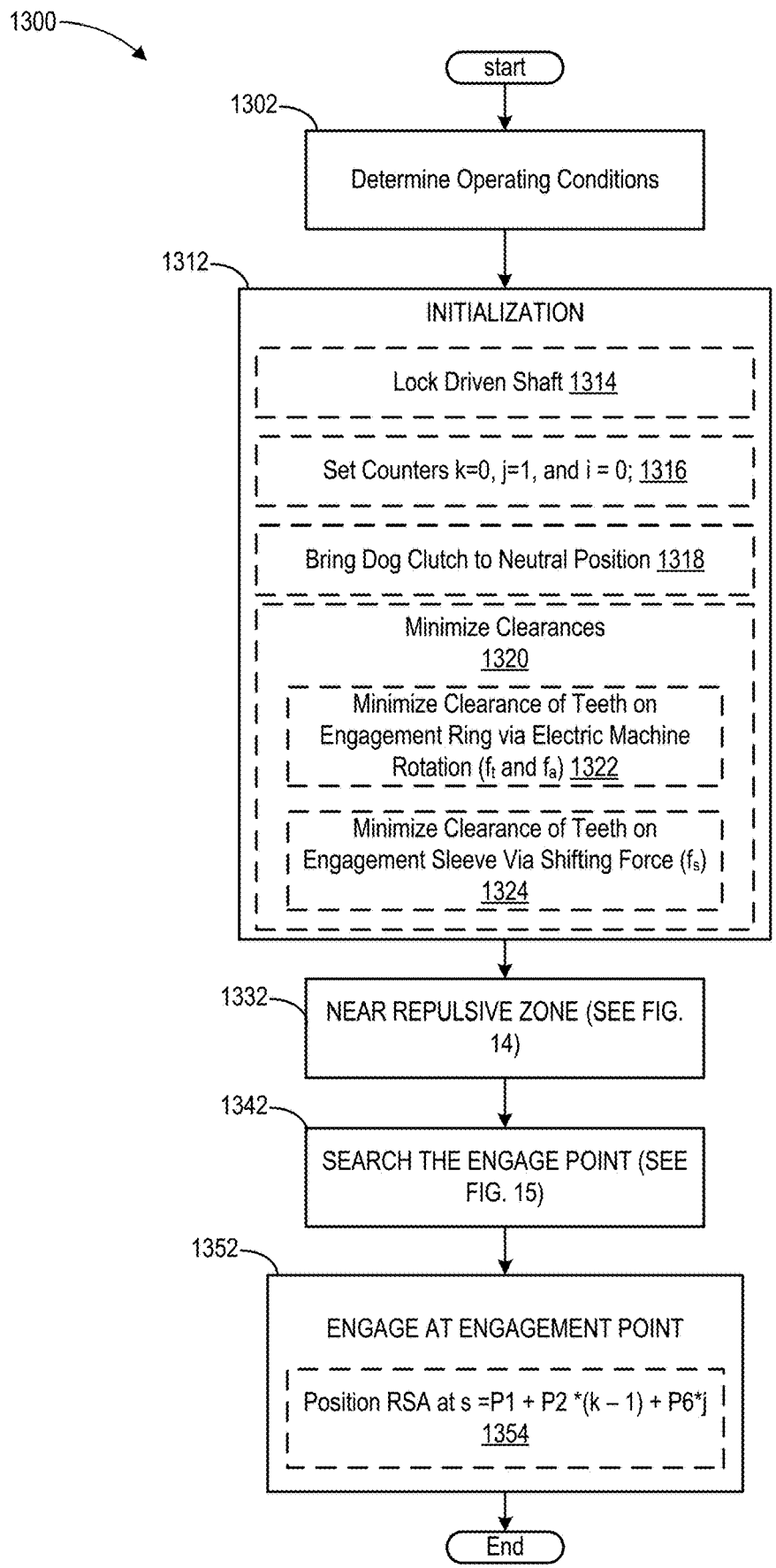
FIG. 13 shows a first method for engaging the clutch of the present disclosure.
Figure 14:
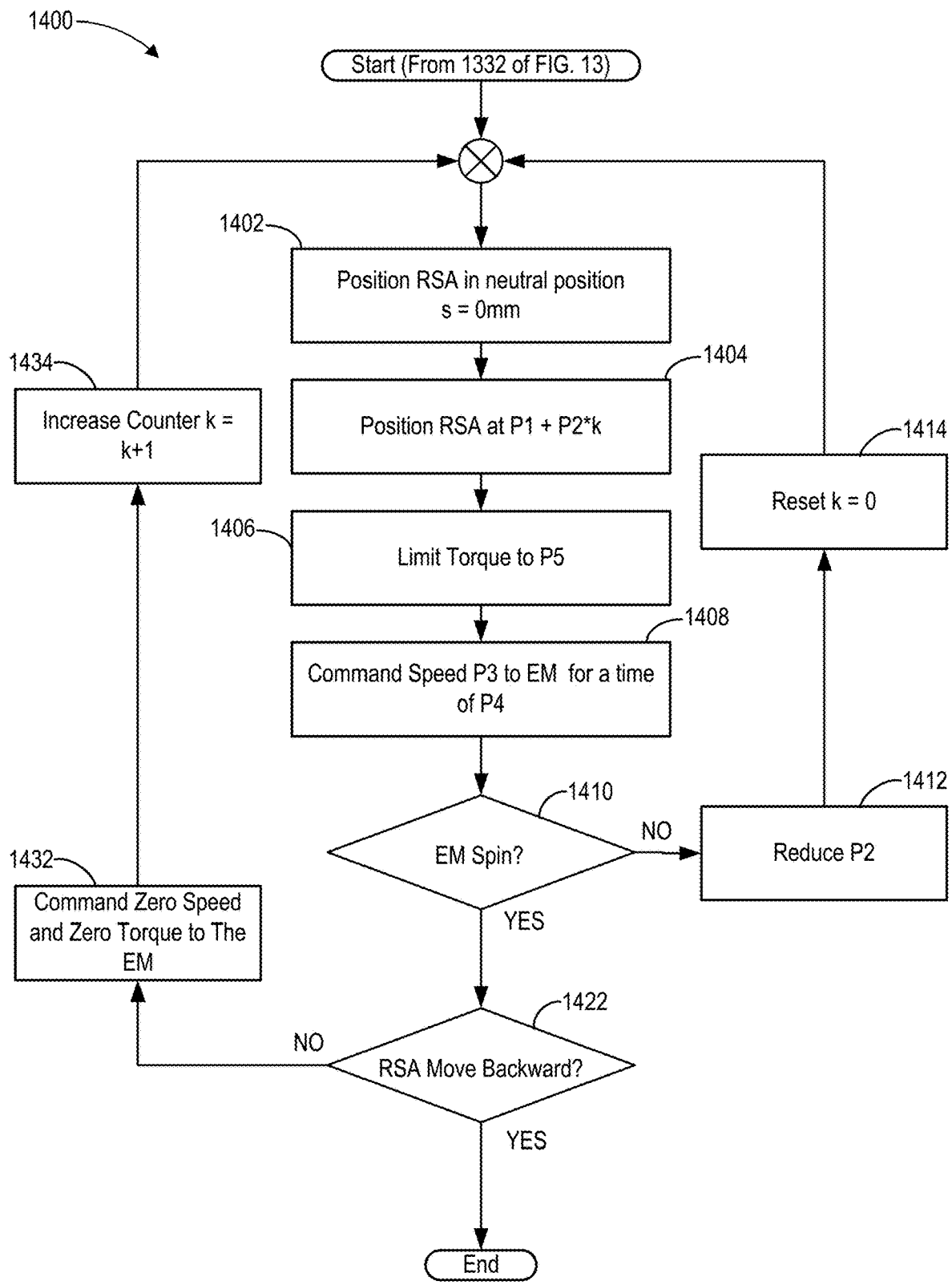
FIG. 14 shows a second method for nearing the repulsive zone of the clutch with a first tooth of the present disclosure.
Figure 15:
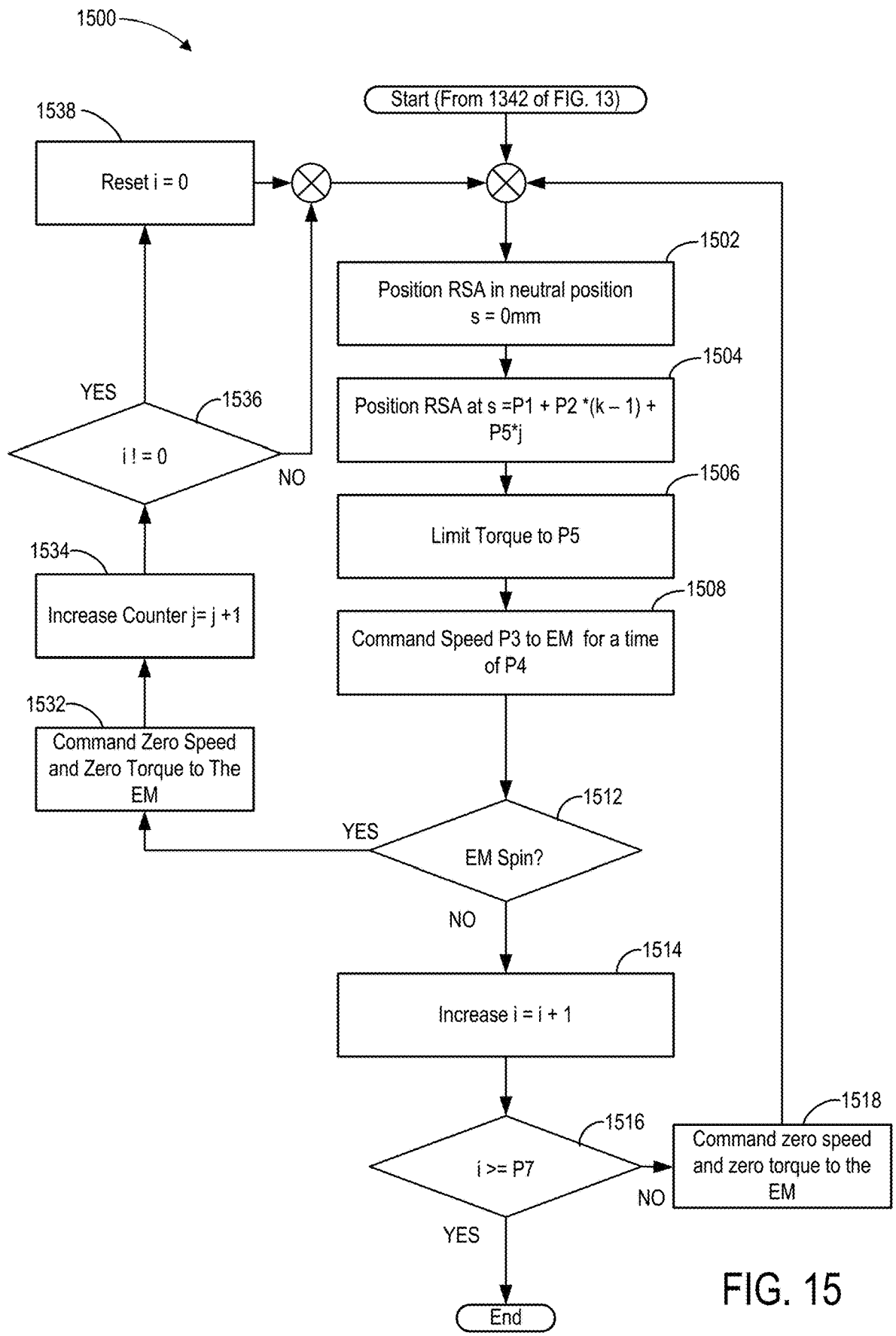
FIG. 15 shows a third method for nearing the engaging first tooth with the second tooth once the repulsive zone has been identified and passed.

FIG. 10 shows the position of the first tooth and second tooth during a first event that may occur when searching for the repulsive zone using the algorithm. FIG. 11 shows the position of the first tooth and second tooth during a second event that may occur when searching for the repulsive zone and the attractive zone using the algorithm. FIG. 12 shows the position of the first tooth and second tooth during a third event that may occur when searching for the repulsive zone and the attractive zone using the algorithm. FIG. 13 shows a first method for searching for a neutral threshold position and an engagement threshold position, and engaging at the engagement threshold position for a clutch of the present disclosure. The first method shown in FIG. 13 a plurality of steps may comprise sub-methods, such as the methods shown in FIGS. 14-15. FIG. 14 shows a second method for nearing the repulsive zone of the clutch with a first tooth of the present disclosure. The method of FIG. 14 may also be used to estimate the neutral threshold position. FIG. 15 shows a third method for nearing the engaging the first tooth with the second tooth once the repulsive zone has been identified and passed. The method of FIG. 15 may also be used to estimate the engagement threshold position.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIGS. 1-7 and FIGS. 9A-12 shows schematics of an example configuration with relative positioning of the various components. As used herein, the terms "approximately" is construed to mean plus or minus five percent of the range unless otherwise specified.

Further, FIGS. 1-7 and FIGS. 9A-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified.

Features described as longitudinal may be approximately parallel with an axis that is longitudinal. A lateral axis may be normal to the longitudinal axis. Features described as lateral may be approximately parallel with the lateral axis and normal to the longitudinal axis.

Turning now to FIG. 1, a vehicle 100 is shown comprising a powertrain 101 and a drivetrain 103. The vehicle 100 may have a front end 132 and a rear end 134, located on opposite sides of vehicle 100. Objects, components, and features of the vehicle 100 referred to as being located near the front may be closest to the front end 132 compared to the rear end 134. Objects, components, and features of the vehicle 100 referred to as being located near the rear may be closest to the rear end 134 compared to the front end 132. The powertrain 101 comprises a prime mover 106 and a transmission 108. The prime mover 106 may be an internal combustion engine (ICE) or an electric motor, for example, and is operated to provide rotary power to the transmission 108. The transmission 108 may be an automatic transmission. The transmission 108 receives the rotary power produced by the prime mover 106 as an input and outputs rotary power to the drivetrain 103 in accordance with a selected gear or setting. Additionally, there may be other movers in the vehicle besides prime mover 106. If the prime mover 106 is an ICE there may be at least a second mover with an input to the transmission 108, wherein the second mover may be an electric machine such as an electric motor. In one example, if there are a single or plurality of second movers in addition to the prime mover 106, the vehicle 100 may be a hybrid vehicle, wherein there are multiple torque inputs to the transmission 108. The vehicle 100 may have a longitudinal axis 130. The powertrain 101 and drivetrain 103 may have a length parallel with the longitudinal axis 130.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC). The inverter 107 may include a variety of components and circuitry with thermal demands that effect an efficiency of the inverter.

The vehicle 100 may be a commercial vehicle, light, medium, or heavy duty vehicle, a passenger vehicle, an off-highway vehicle, and/or sport utility vehicle. Additionally or alternatively, the vehicle 100 and/or one or more of its components may be in industrial, locomotive, military, agricultural, and/or aerospace applications. In one example, the vehicle 100 is an all-electric vehicle or a vehicle with all-electric modes of operation, such as a plug-in hybrid vehicle. As such, the prime mover 106 is an electric machine. In one example, the prime mover 106 is an electric motor/generator. For these examples the drivetrain 103 may be electrified, and therein an electrified drivetrain.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a rear-wheel drive or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing. The first driveshaft 113 and second driveshaft 122 may be positioned to extend in parallel with the longitudinal axis 130. For an example of a configuration of vehicle 100, the second driveshaft 122 may be centered about the longitudinal axis 130.

The first differential 116 may supply a FWD in some capacity to vehicle 100, as part of rotary power transferred via the first driveshaft 113. Likewise, the second differential 126 may supply a RWD to vehicle 100, as part of the rotary power transferred via the second driveshaft 122. The first differential 116 and the second differential 126 may supply a FWD and RWD, respectively, as part of an AWD mode for vehicle 100.

A parking brake may be positioned on one or more of the driveshafts of the vehicle 100. For example, a parking brake 142 may be placed on the second driveshaft 122, such as to engage on the second driveshaft 122. When engaged the parking brake 142 may prevent the rotation of the second driveshaft 122, therein stalling the second driveshaft 122. When the second driveshaft 122 is stalled, the rotational elements in the transmission 108 and the transfer case 110 may also be stalled. Additionally or alternatively, a parking brake may be placed on the first driveshaft 113, such as to engage on the first driveshaft 113.

Adjustment of the drivetrain 103 between the various modes as well as control of operations within each mode may be executed based on a vehicle control system 154, including a controller 156. Controller 156 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. In one example, controller 156 may be a powertrain control module (PCM).

Controller 156 may receive various signals from sensors 158 coupled to various regions of vehicle 100. For example, the sensors 158 may include sensors at the prime mover 106 or another mover to measure mover speed and mover temperature, a pedal position sensor to detect a depression of an operator-actuated pedal, such as an accelerator pedal or a brake pedal, speed sensors at the first and second set of wheels 104, 114, etc. Vehicle acceleration is directly proportional to accelerator pedal position, for example, degree of depression. Upon receiving the signals from the various sensors 158 of FIG. 1, controller 156 processes the received signals, and employs various actuators 160 of vehicle 100 to adjust drivetrain operations based on the received signals and instructions stored on the memory of controller 156. For example, controller 156 may receive an indication of depression of the brake pedal, signaling a desire for decreased vehicle speed. In response, the controller 156 may command operations, such as shifting gear modes of the transmission 108.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

In some embodiments, additionally or alternatively, the transmission 108 may be a first transmission, further comprising a second transmission arranged on the second set of axle shafts 128. Herein, the transmission 108 may be interchangeably referred to as a gearbox.

Turning to FIG. 2, a schematic 200 of the transmission 108 and gear enclosure 203 illustrated with reference to FIG. 1 is shown. The gear enclosure 203 may be enclosed by and be comprised of the housing of the transmission 108. In one example, the gear enclosure 203 contains a gear assembly 202. The gearbox (e.g., the transmission 108) may be a multi-stage reduction gearbox with the gear assembly 202 acting as a system of a plurality of reduction sets. The gear assembly 202 may be formed of at least two reduction sets that may reduce the rotational speed (e.g., rotation per minute (RPM)) and increase the torque. The reduction sets may be referred to herein as stages. The stages may be gearsets. There may be a first stage 204 and second stage 206. The first stage 204 and second stage 206 may comprise gears, such as fixed gears. The transmission 108 may have an input from an electric machine 207. The electric machine 207 may be the prime mover 106 of FIG. 1, such as if vehicle 100 of FIG. 1 is an EV. The electric machine 207 may be another mover such as if vehicle 100 is a hybrid vehicle.

As an example, the enclosure 203 of the transmission 108 may contain a first shaft 208, a second shaft 210, and a third shaft 212. The first stage 204 may be supported by the first shaft 208 and the second shaft 210. The second stage 206 may be supported by the first shaft 208 and the second shaft 210. The first shaft 208 may act as an input to the first stage 204 and second stage 206. The second shaft 210 may act as an output for the first stage 204 and the second stage 206. The first stage 204 may rotationally and drivingly couple the first shaft 208 to the second shaft 210. The second stage 206 may rotationally and drivingly couple first shaft 208 to the second shaft 210. The first shaft 208 may be centered on a first axis 216. The second shaft 210 may be centered on a second axis 218. The first stage 204 may also be rotationally and drivingly coupled to a third shaft 212. The third shaft 212 may be centered on a third axis 220. The first axis 216, second axis 218, and third axis 220 may be parallel with one another. The first stage 204 may traverse the first axis 216 to the second axis 218. The second stage 206 may traverse the first axis 216 to the third axis 220.

The first shaft 208 may drivingly couple a first input shaft to gear assembly 202. For the example shown in schematic 200, the first input shaft may be an output shaft 214 of the electric machine 207. The output shaft 214 may be referred to herein as the mover output shaft 214. Shafts and other components that may be drivingly coupled but not directly contacting may be represented by dotted lines 219.

However, other configurations of the gearbox are possible. For example, the first input shaft may be a shaft drivingly coupled to output shaft 214 or the output of another reduction set. Additionally, for other configurations, there may be only a single shaft, such as second shaft 210, that may be selectively and drivingly coupled to the first shaft 208 via reduction ratios. For example, the first stage 204 and second stage 206 may selectively and drivingly couple the first shaft 208 to the second shaft 210.

The second shaft 210 and third shaft 212 may be drivingly coupled to a first output shaft. For the example shown in schematic 200, the first output shaft may be a drive shaft, such as the second driveshaft 122. However, other configurations of the gear assembly 202 and enclosure 203 are possible. For example, the first output shaft may be a shaft drivingly coupled to a drive shaft, such as the second driveshaft 122, or to another reduction set. Additionally, for other examples, the second shaft 210 and/or third shaft 212 may be drivingly coupled to separate outputs shafts. For example, the second shaft 210 may be drivingly coupled a first output shaft, such as the first driveshaft 113 of FIG. 3. For this example, the third shaft 212 may be drivingly coupled to a second output shaft, such as the second driveshaft 122. Additionally, for other examples, the second shaft 210 and/or third shaft 212 may be output shafts.

An actuator 222 may be used to selectively and drivingly couple the first stage 204 or second stage 206 to the first shaft 208. The actuator 222 may be drivingly coupled to a shifting rod 224. The actuator 222 may be mounted to the transmission 108 or a component of the transmission 108, such as the walls and surfaces of the enclosure 203. For one example, the actuator 222 may be mounted via fastening by a plurality of fasteners, such as screws. For another example, the actuator may be fit to a recess or void of surfaces and material of the transmission 108. The actuator 222 may be one of the actuators 160 of FIG. 1.

The actuator 222 may shift the shifting rod 224 along a fourth axis 226, via translation. When shifted in a first direction, such as toward the front end 132, the shifting rod 224 may drivingly couple the first stage 204 to the first shaft 208. When shifted in a second direction, such as toward the rear end 134, the shifting rod 224 may drivingly couple the second stage 206 to the first shaft 208. The shifting rod 224 may be guided by the housing of the transmission 108 and/or enclosure 203. For an example, the actuator 222 may be an RSA. The actuator 222 may be an electric actuator, a hydraulic actuator, or an electro-hydraulic actuator. The actuator 222 may also be one of the actuators 160 of FIG. 1.

The enclosure 203 may form a sump 228 for work fluid 230. The work fluid 230 may be a lubricant, such as oil. The gears of the first stage 204 and second stage 206 may be lubricated by the work fluid 230 via splashing. The sump 228 may be located below the assembly 202, such that work fluid 230 may be returned to the sump 228 via the force of gravity 260 represented by an arrow.

The first stage 204 and second stage 206 may be formed of a plurality of gears. Both the first stage 204 and second stage 206 may each be formed from at least two gears. For an example, the first stage 204 may comprise a first gear 232 and a second gear 234. For this example, the second stage 206 may comprise a third gear 236 and a fourth gear 238. At least one of the gear sets may have an idler gear, such as idler gear 235. For example, the first stage 204 may comprise the idler gear 235. The idler gear 235 may allow rotational energy via torque to be transferred in the same direction from the first shaft 208 to the second shaft 210 across the first stage 204. The idler gear 235 may be positioned between and in mesh with the first gear 232 and the second gear 234.

There may be a plurality of arms and engagements used by the shifting rod 224 and actuator 222 to drivingly couple reduction sets. There may be at least one arm and two engagements drivingly coupled to the shifting rod 224 to select reduction sets. The number of arms and engagements drivingly coupled to the shifting rod 224 may be dependent on the number of sets to engage. The first stage 204 may be drivingly coupled to the first shaft 208 via a first engaging component 240 and first coupling 244. Likewise, the second stage 206 may be drivingly coupled to the first shaft 208 via a second engaging component 242 and second coupling 246. The first engaging component 240 and second engaging component 242 may be shiftingly coupled to the shifting rod 224 via a first arm 248 and a second arm 250, respectively.

The first coupling 244 and second coupling 246 may be drivingly coupled to the second gear 234 and third gear 236, respectively. The first engaging component 240 and first coupling 244 may form a clutch, such as a dog clutch. The second engaging component 242 and second coupling 246 may form a clutch, such as a dog clutch. The first engaging component 240 and second engaging component 242 may each be dog engagements.

The idler gear 235 may drivingly couple to a third coupling 254. The third coupling 254 may be complementary to a third engaging component 252. The idler gear 235 may be selectively coupled to the third shaft 212 via the third engaging component 252 and third coupling 254. The third coupling 254 may be shiftingly coupled to the shifting rod 224 via a third arm 256. The actuator 222 and shifting rod may shift the third coupling 254 to engage or disengage, e.g., couple or decouple, from the third engaging component 252. When the idler gear 235 is selectively coupled via the third engaging component 252 and the third coupling 254, the idler gear 235 may be rotationally and drivingly coupled to the third shaft 212. The third engaging component 252 and third coupling 254 may form a clutch, such as a dog clutch. The third coupling 254 may be a dog engagement.

When rotationally couple to the third shaft 212 the idler gear 235 may enable an additional and specific ratio, such that a different speed may be produced by the same input to the first stage 204. The first stage 204 may enable two ratios. For example, the first stage 204 may enable a first ratio when the first coupling 244 and first engaging component 240 are engaged and the third coupling 254 and the third engaging component 252 are disengaged. For this example, the first stage 204 may enable a second ratio when the first coupling 244 and first engaging component 240 are disengaged and the third coupling 254 and the third engaging component 252 are engaged.

Schematic 200 shows a single shifting rod, shifting rod 224, that may be shifted by the actuator 222. The shifting rod 224 may physical couple to and actuate the first arm 248 and the second arm 250. However, it is to be appreciated that the schematic 200 is non-limiting and there may be a plurality of shifting rods and actuators. For example, there may be a plurality of shifting rods shifted by actuator 222. For another example, there may be a plurality of shifting rods wherein each shifting rod is shifted by an actuator specifically coupled to each shifting rod. For these examples, each shifting rod may be specific to an arm, such as the first or second arm 248, 250, that may be used to actuate engagements, such as the first or second engaging components 240, 242.

A control unit to engage the clutches of the present disclosure, such as the clutch assembly comprising third engaging component 252 and the third coupling 254, may be calibrated using the method of the present disclosure. When the control unit searches for a neutral threshold position and an engagement threshold position using the method of the present disclosure, an output shaft may be locked to prevent rotation using a dedicated end-of-line device or a parking brake. For example, when the control unit searches for the neutral threshold position and the engagement threshold position, the second driveshaft 122 may be locked via an end-of-line device or a parking brake, such as the parking brake 142 of FIG. 1. Additionally or alternatively, when the control unit searches for the neutral threshold position and the engagement threshold position, the another shaft rotationally coupled to the shaft 212, such as another drive shaft or an output shaft, may be locked via an end-of-line device or a parking brake.

Turning to FIG. 3, it shows a gear engagement schematic 300. The gear engagement schematic 300 may be a schematic comprising a clutch assembly that may selectively and rotationally couple a gear to a shaft. The clutch assembly may be a dog clutch assembly comprising a dog clutch. However, the gear engagement schematic 300 may be used for other gear clutch assemblies used to engage other gears to shafts. For an alternative example, the gear engagement schematic 300 may be a clutch assembly comprising the first engaging component 240 and first coupling 244. For the alternative example or another example, the gear engagement schematic 300 may be a clutch assembly comprising the second engaging component 242 and second coupling 246 of FIG. 2.

The output shaft 214 may be centered on a first axis 312. The first axis 312 may be an axis of rotation (e.g., a rotational axis), wherein the output shaft 214 may rotate about the first axis 312. The output shaft 214 may be rotationally and drivingly coupled to a partial gear set 314, such that rotational energy via torque may be transferred from the output shaft 214 to the partial gear set 314. The partial gear set 314 may be comprised by a larger gear set, such as the first stage 204 of FIG. 2. The partial gear set 314 may be selectively coupled to a shaft 318. The shaft 318 may be third shaft 212 of FIG. 2. When selectively couple to the shaft 318, the partial gear set 314 may be drivingly coupled to the shaft such that rotational energy via torque may be transferred from the partial gear set 314 to the shaft 318. The shaft 318 may be centered on a second axis 319. The second axis 319 may be an axis of rotation (e.g., a rotational axis), wherein the shaft 318 may spin about the second axis 319. The first axis 312 and the second axis 319 may be parallel.

An electronic control unit (ECU) 322 may be communicatively coupled to an actuator 222 and the electric machine 207. Communicative couplings 320 between components of the gear engagement schematic 300 may be represented by dotted lines with arrows. The signals may be sent through the communicative couplings, such as data read from sensors or commands to alter conditions. An arrow of a communicative coupling 320 facing toward a component represents the direction a communicative signal may travel. The ECU 322 may be part of the control system 154 of FIG. 1. For an example, the ECU 322 may be the controller 156 of FIG. 1.

The ECU 322 may use electronic command signals commands to control the torque output by and the rotational speed of the electric machine 207. The electric machine 207 may output rotational energy via torque to drive the output shaft 214. When torque is output to the output shaft 214, the output shaft 214 may have a rotational speed ($\omega_d$) 324 and a torque ($T_d$) 326 about the first axis 312. The rotational speed 324 may be the rotational speed of the driving gear of the partial gear set 314, therein rotational speed 324 may be referred to herein as a driving rotational speed 324. Likewise, rotational speed 324 may alternative be referred to as $\omega_d$ 324 in the figures and in the specification below. The torque 326 may be may the torque of the driving gear of the partial gear set 314, therein the torque 326 may be referred to herein as driving torque 326 in the specification below. Likewise, torque 326 may be referred to herein as $T_d$ 326 in the figures and the specification below. The driving rotational speed 324 may be represented by a curved arrow about the first axis 312. The $T_d$ 326 may be represented by a curved arrow about the first axis 312 and a straight arrow coaxial with the axis 312. The curved arrow represents the direction of rotation for the driving rotational speed 324. The curved arrow represents the direction of rotation and the straight arrow represents the magnitude of torque for the $T_d$ 326

The ECU 322 may use electronic signal commands to control the position of and translate the shifting rod 224 via the actuator 222. A line 328 may represent a position where an engaging assembly shiftingly coupled to the shifting rod 224 may be positioned. A shift direction(s) 330 may be the direction that the shifting rod 224 and engaging assembly may be shifted to engage with a gear of the partial gear set. The shift direction may be parallel to an axis such as the first axis 312 or second axis 319. The shift direction 330 may be represented in FIG. 3 via an arrow and an s symbol. The shift direction 330 may be referred to alternatively herein as s direction 330. When actuated in the s direction 330, the shifting rod 224 may be translated closer toward the partial gear set 314.

The partial gear set 314 may comprise at least a first gear 332 and a second gear 334. The first gear 332 is a driving gear that may drive the second gear 334. The second gear 334 is a driven gear. As an example, the second gear 334 is an idler gear, such as the idler gear 235 of FIG. 2. Likewise, the first gear 332 may be the first gear 232 of FIG. 2. The second gear 334 may be positioned about the shaft 318, as to be radially about the shaft 318 with respect to the centerline of shaft 318.

The engaging assembly may comprise a plurality of components that may be shifted by the actuator, such as a shift fork 336 and components of a clutch assembly 338. The shift fork 336 may shiftingly couple components of the clutch assembly 338 to the shifting rod 224. When actuated in the s direction 330, the shift fork 336 may engage the clutch assembly 338 with a gear of the partial gear set 314. When engaged with the partial gear set 314, the clutch assembly 338 may selectively couple to the second gear 334. When selectively coupled to the second gear 334, the clutch assembly 338 may selectively and rotationally couple the second gear 334 to the shaft 318.

The second gear 334 may be fit to a first groove 340 of the shaft 318. The first groove 340 may be radially about and depress into the material of the shaft 318. There may be a first clearance 344 between the walls of the first groove 340 and the features of the second gear 334. The first clearance 344 may be approximately the minimum distance the shift fork 336 and components of the clutch assembly 338 may be shifted to engage with the second gear 334. A position sensor 342 may be communicatively coupled to the ECU 322. The position sensor 342 may estimate the position of the shifting rod 224 and/or actuation of the actuator 222. The ECU 322 may use data from the position sensor to estimate the position of the shift fork 336 and components of the clutch assembly 338 may be shifted by the shift fork 336. Using the position data from the position sensor 342, the ECU 322 may estimate the distance the shifting rod 224 may be shifted in the s direction 330 and the speed of actuation by the actuator 222 for the clutch assembly 338 to engaged with the second gear 334.

A first axial force ($f_a$) 346 may be placed on the second gear 334. $f_a$ 346 is a force that is parallel with the second axis 319. $f_a$ may be transferred through the shaft 318. The $f_a$ 346 may be produced by torque (Ta) 326, as the torque (Ta) 326 is transferred from the first gear 332 to the second gear 334. The $f_a$ 346 may have a magnitude parallel and in the direction of the s direction 330. The $f_a$ 346 may increase the distance of the clearance 344, as the second gear 334 may be translated closer to a wall of the first groove 340 opposite the clearance 344. The first groove 340 and clearance 344 may allow the second gear 334 to spin freely about the shaft 318.

The clutch assembly 338 may be of a dog clutch configuration. The clutch assembly 338 may comprise an engaging sleeve, such as engaging ring 352. The clutch assembly may also comprise a hub 354 and an engagement ring 356. The engaging ring 352 may be positioned about and supported by the hub 354. The hub 354 may be positioned about the shaft 318. The hub 354 may also be physically and rotationally coupled to the shaft 318. The engaging ring 352 may be rotationally coupled to the shaft 318, such as when supported by the hub 354. The engaging ring 352 may be shiftingly coupled to the shifting rod 224 via the shift fork 336. The shift fork may be positioned about a second groove 360 of the engaging ring 352. The shift fork 336 may be fit to the second groove 360, such that there may be a second clearance 358 between the walls of the groove and the shift fork 336. The engagement ring 356 may physically couple and rotationally couple to the second gear 334. As an example, the second gear 334 may comprise the engagement ring 356. The engagement ring 356 may be positioned about the first groove 340, such as when physically coupled to the second gear 334. When positioned about the first groove 340, the clearance 344 may be positioned between the engagement ring 356 and the nearest wall of the first groove 340. The first groove 340 and clearance 344 may allow the engagement ring 356 to spin about the shaft 318 with the second gear 334.

The clutch assembly 338 may engage with the second gear 334 when the engaging ring 352 selectively couples the engagement ring 356. The engaging ring 352 may selectively couple to the engagement ring 356 when shifted in the s direction 330 by the shifting rod 224 and shift fork 336. When selectively coupled to the engagement ring 356, the engaging ring 352 may selectively and rotationally couple the engagement ring 356 to the hub 354.

The first gear 332 may comprise a plurality of first teeth 372. The second gear 334 may comprise a plurality of second teeth 374. The first gear 332 and second gear 334 may be meshed via the first teeth 372 and second teeth 374. The first teeth 372 and second teeth 374 may mesh to drivingly couple the first gear 332 and second gear 334. The first teeth 372 and second teeth 374 may each have a mesh of a helical angle ($\gamma$) 376. The helical angle 376 may be alternatively referred to and interchangeably represented in figures by the symbol $\gamma$ 376. The helical angle 376 may also be represented in the figures, such as FIG. 3, by the symbol $\gamma$ imposed on a schematic representation of an angle. Additionally, the helical angles 376 may alternatively be referred to as helix angles. The helical angle 376 may be greater than a first threshold angle, such as 10 degrees (e.g., $\gamma > 10°$).

The $f_a$ 346 may act on the second gear 334 and be produced by the $T_d$ 326 applied to the first gear 332. The $f_a$ 346 may be calculated from and represented by a first equation.

$$f_a = \frac{2 * T_d}{D_d} * \tan(\gamma) \qquad \text{Equation 1}$$

$D_d$ of equation 1 represents a pitch diameter of teeth of a driving gear, such as the first gear 332.

Turning to FIG. 4, it shows a simplified schematic 400. The simplified schematic 400 is a lump element model of the gear engagement schematic 300 of FIG. 3, wherein the engaging ring 352 and engagement ring 356 are simplified to lines.

The axial clearances, such as the first clearance 344 and the second clearance 358, have been represented with two translational hard stop elements. A first hard stop element is comprised by one in the fork-sleeve coupling, e.g., the second groove 360 of the engaging ring 352. A second hard stop element may be comprised by the idle gear and a coupling to the shaft 318. For an example of simplified schematic 400, the second hard stop may comprise the first groove 340. The rotational coordinates of an engaging sleeve and an engagement component, such as the engaging ring 352 and the engagement ring 356, are rectified into linear coordinates in the simplified schematic 400. The linear coordinates are in the direction perpendicular to the axial coordinate s. The with the s direction 330 corresponds with and is parallel with an axis of the axial coordinates S.

The simplified schematic 400 shows additional forces, such as tangential force ($f_t$) 432, a second axial force ($f_d$) 434, and a shift force ($f_s$) 436. The $f_t$ 432 may be produced by $T_d$ 326, as the $T_d$ 326 is transferred to the shaft 318. The $f_d$ 434 is a force parallel to the rotational axis. The $f_d$ 434 may be produced by the $T_d$ 326, as the $T_d$ 326 is transferred to the engaging ring 352. The $f_d$ 434 may be complementary or opposite to the s direction 330. The direction of the $f_d$ 434 may be dependent on the position of the shifting rod 224 and the engaging ring 352 relative to the engagement ring 356. The $f_s$ 436 may be produced by the actuator 222 and may shift the shifting rod 224 and by extension the engaging ring 352. The $f_s$ 436 may be parallel with the s direction 330. The $f_s$ 436 may also be complementary to or opposite to the s direction 330, depending on the actuation of the actuator 222. For example, when acting on the shifting rod 224 to engage the engaging ring 352 to the engagement ring 356, the $f_s$ 436 may be complementary to the s direction 330. For another example, when acting on the shifting rod 224 to disengage the engaging ring 352 from the engagement ring 356, the $f_s$ 436 may be opposite to the s direction 330.

The simplified gear engagement schematic shows a first tooth 442 and a second tooth 444. The engaging ring 352 may comprise at least a first tooth, such as the first tooth 442. The engagement ring 356 may comprise at least a second tooth, such as the second tooth 444. The engaging ring 352 may comprise a plurality of first teeth of dimensions of the first tooth 442. The engagement ring 356 may comprise a plurality of second teeth of the dimensions of the second tooth 444. For an example of an embodiment, the first tooth 442 and the second tooth 444 may have approximately the same dimensions.

The $f_t$ 432 may be generated from the same sources as the $f_a$ 346. For example, the $f_t$ 432 may act on the second gear 334 and be produced by the $T_d$ 326 applied to and transferred via the first gear 332. The $f_t$ 432 may be calculated from, represented by, and mathematically linked to the $T_d$ 326 via a second equation.

$$f_t = \frac{2 * T_d}{D_d} \qquad \text{Equation 2}$$

As in equation 1, $D_d$ of equation 2 represents a pitch diameter of teeth of a driving gear, such as the first gear 332.

The $f_t$ 432 may produce different values and directionality for the $f_d$ 434 based on the position of the first tooth 442 relative to the second tooth 444. By extension, $f_t$ 432 may produce different values and directionality for the $f_d$ 434 based on the position of the engaging sleeve, such as the engaging ring 352, relative to the engagement ring 356.

For example, surface sharing contact between a first feature of the first tooth 442 and a second feature of the second tooth 444 may direct and transfer a portion the $f_t$ 432 such that the $f_d$ 434 is in a direction opposite to the s direction 330. When the $f_d$ 434 is opposite to the s direction the first tooth 442 may be pushed away from the second tooth 444, such as if the $f_s$ 436 is less than the $f_d$ 434. When the first tooth 442 is pushed away from the second tooth 444, the engaging ring 352 may be pushed opposite the s direction 330 away from the engagement ring 356.

If the $f_s$ 436 is greater than the $f_d$ 434 when the first feature of the first tooth 442 is in surface sharing contact with the second feature of the second tooth 444, the first tooth 442 may continue to be pushed in the s direction 330 toward the second tooth 444; however, grinding may occur between the first tooth 442 and second tooth 444. Likewise, grinding may occur for other features of the engaging ring 352, other features of the engagement ring 356, and other features of the gear and gear set complementary to the engagement ring 356, such as second gear 334.

For another example, surface sharing contact between a third feature of the first tooth 442 and a fourth feature of the second tooth 444 may direct the $f_t$ 432 such that the $f_d$ 434 is in a complementary to the s direction 330. When the $f_d$ 434 is complementary to the s direction the first tooth 442 may be pushed toward and lock with the second tooth 444 by the $f_d$ 434. When the first tooth 442 is pushed toward and locked with the second tooth 444, the engaging ring 352 may be pulled in s direction 330 toward and engage with the engagement ring 356.

Turning to FIGS. 5A-5B, they show schematic representations of two positions wherein the first tooth 442 and second tooth 444 may have surface sharing contact. FIG. 5A shows the first tooth 442 and second tooth 444 in surface sharing contact in a first position referred to herein as a neutral threshold position 500. FIG. 5B shows the first tooth 442 and second tooth 444 in surface sharing contact in a second position referred to herein as an engagement threshold position 540. When in the neutral threshold position 500 the first tooth 442 and second tooth 444 may not selectively couple. The neutral threshold position 500 may also be referred to as a touch point or a touch point position. When in the engagement threshold position 540 the first tooth 442 and second tooth 444 may be selectively coupled.

Both FIGS. 5A-5B show additional features of the first tooth 442 and second tooth 444. As such, the features of the first tooth 442 and second tooth 444 for FIGS. 5A-5B may be introduced and discussed collectively. As an example, the first tooth 442 comprises a first leading surface 504, a second leading surface 506. The second leading surface 506 may be above the first leading surface 504. The first tooth 442 may also comprise at least a first contact edge 512 and at least a third contact edge 522. The first tooth 442 comprises a first trailing surface 532 and a second trailing surface 534. The second trailing surface 534 may be above the first trailing surface 532. The first leading surface 504 and the second leading surface 506 may meet at and form the first contact edge 512. The first leading surface 504 and first trailing surface 532 may meet at and form the third contact edge 522.

Likewise, the second tooth 444 comprises a third leading surface 508 and a fourth leading surface 510. The third leading surface 508 may be above the fourth leading surface 510. The second tooth 444 may also comprise at least a second contact edge 514 and at least a fourth contact edge 524. The second tooth 444 comprises a third trailing surface 536 and a fourth trailing surface 538. The fourth trailing surface 538 may be above the third trailing surface 536. The second contact edge 514 may be formed at the intersection between the first leading surface 504 and the second leading surface 506. The third leading surface 508 and the fourth leading surface 510 may meet at and form the second contact edge 514. The third leading surface 508 and fourth trailing surface 538 may meet at and form the fourth contact edge 524.

As an example, the first tooth 442 may lock with the second tooth 444 when the first trailing surface 532 is in surface sharing contact with the fourth trailing surface 538. As another example, the first tooth 442 may lock with the second tooth 444 when second trailing surface 534 is in surface sharing contact with the third trailing surface 536.

Returning to FIG. 5A, when the first tooth 442 and second tooth 444 are in the neutral threshold position 500, the first contact edge 512 and second contact edge 514 may make surface sharing contact. Alternatively, the first leading surface 504 may make surface sharing contact with the third leading surface 508. Alternatively, the second leading surface 506 may make surface sharing contact with the fourth leading surface 510. When the first contact edge 512 and second contact edge 514 are in surface sharing contact, or the first leading surface 504 and third leading surface 508 are in surface sharing contact, the first tooth 442 may slide upward against the third leading surface 508. Alternatively, When the first contact edge 512 and second contact edge 514 are in surface sharing contact, or the second leading surface 506 and the fourth leading surface 510 are in surface sharing contact, the first tooth 442 may slide downward the fourth leading surface 510. The first tooth 442 may engage with the second tooth 444 from the neutral position, such as when the third contact edge 522 slides past the fourth contact edge 524. However, engaging from the neutral threshold position may result in grinding or vibrations during engagement. For example, grinding or vibrations may occur between the first tooth 442 and second tooth 444 when the first tooth 442 slides against the third leading surface 508 or the fourth leading surface 510.

Returning to FIG. 5B, when the first tooth 442 and second tooth 444 are in the engagement threshold position 540 for a first example. When in the engagement threshold position 540, the third contact edge 522 and the fourth contact edge 524 may make surface sharing contact. Alternatively, the first trailing surface 532 may make surface sharing contact with the fourth trailing surface 538. When the first contact edge 512 and second contact edge 514 are in surface sharing contact, or the second leading surface 506 and the fourth leading surface 510 are in surface sharing contact, the first tooth 442 may slide downward against the fourth leading surface 510.

For another example, when the first tooth 442 and second tooth 444 are in another engagement threshold position, a contact edge mirrored and opposite the first tooth 442 from the third contact edge 522 and a contact edge mirrored and opposite the second tooth 444 from the fourth contact edge 524 may make surface sharing contact. Alternatively, the second trailing surface 534 may make surface sharing contact with the third trailing surface 536. For the aforementioned conditions mentioned above in the paragraph, the first tooth 442 may slide downward against the third trailing surface 536.

The first tooth 442 and second tooth 444 engage from an engagement threshold position, such as the engagement threshold position 540. When engaged from the engagement threshold position 540, grinding may be prevented between the engaging ring 352 and engagement ring 356 and/or the gears of the partial gear set 314 of FIG. 3. For example, when the first tooth 442 and second tooth 444 engaged at the engagement threshold position 540 instead of the neutral threshold position 500, less grinding and/or vibration may occur between engaging ring 352 and engagement ring 356 and/or the gears of the partial gear set 314.

Turning to FIG. 6, it shows a schematic 600 of a tooth 610. The tooth 610 may share approximately the same dimensions of either and may be the first tooth 442 or the second tooth 444 of FIGS. 4-5B. Tooth 610 may be a tapered tooth.

The tooth 610 may have a centerline 612. The centerline 612 may extend through and split a first contact edge 622 into two halves. For an example, the centerline 612 may divide the tooth 610 into approximately symmetrical halves. A second contact edge 624 and a third contact edge 626 may be positioned on opposite sides of the centerline 612. The first contact edge 622 may be the first contact edge 512 or the second contact edge 514 of FIGS. 5A-5B. The second contact edge 624 may be the fourth contact edge 524 of FIGS. 5A-5B. The third contact edge 626 may be the third contact edge 522 of FIGS. 5A-5B.

A first leading surface 632 and a second leading surface 634 may meet at and be contiguous via the first contact edge 622. The first leading surface 632 and a first trailing surface 642 may meet at and be contiguous via the second contact edge 624. The second leading surface 634 and a second trailing surface 644 may meet at and be contiguous via the third contact edge 626. The first leading surface 632 may be first leading surface 504 or fourth leading surface 510 of FIGS. 5A-5B. The second leading surface 634 may be second leading surface 506 or third leading surface 508 of FIGS. 5A-5B. The first trailing surface 642 may be the first trailing surface 532 or the third trailing surface 536 of FIGS. 5A-5B. The second trailing surface 644 may be the second trailing surface 534 or the fourth trailing surface 538 of FIGS. 5A-5B.

The tooth 610 may be defined by a first angle, referred to herein as an alpha angle (α) 652, and a second angle, referred to herein as a beta angle (β) 654. The alpha and beta angles 652, 654 may be angled from the centerline 612. The second leading surface 634 may extend at the alpha angle 652 from the centerline 612. The second leading surface 634 may be parallel with and extend with a first arm 662 of the alpha angle 652 from the centerline 612. The first leading surface 632 may be mirrored over the centerline 612 with respect to the second leading surface 634. The second trailing surface 644 may extend at the beta angle 654 from the centerline 612. The second trailing surface 644 may be parallel with and extend with a second arm 664 of the beta angle 654 from the centerline 612. The first trailing surface 642 may be mirrored over the centerline 612 with respect to the second trailing surface 644. The alpha angle 652 may be defined by a range. For example, the alpha angle 652 may be greater than 40° and less than 60°, (e.g., 40°<α<60°). The beta angle 654 may be defined by a range. For example, the beta angle 654 may be greater than 0° and less than 20°, (e.g., 0°≤β<20°).

The first leading surface 632 may extend at a first complementary angle from the centerline 612. The first leading surface 632 may be parallel and extend with an arm of the first complementary angle from the centerline 612. The complementary angle of the first leading surface 632 may have the same dimensions as and be mirrored over the centerline 612 with respect to the alpha angle 652. The first trailing surface 642 may extend at a second complementary angle from the centerline 612. The first trailing surface 642 may be parallel and extend with an arm of the second complementary angle from the centerline 612. The second complementary angle of the first trailing surface 642 may have the same dimensions as and be mirrored over the centerline 612 with respect to the beta angle 654.

Turning to FIG. 7, it shows a plurality of schematics 700 that each illustrate a position. Each position of the schematics 700 may be a position that the first tooth 442 and second tooth 444 may be at during position searching, neutral, and engagement operations.

The schematics may be part of a trace, correspond with an s axis 708 representing distance. For the positions shown in the plurality of schematics, the actuator that shifts the first tooth 442, such as actuator 222 of FIGS. 2-4, may be shifted to prescribed positions arranged at different points along the s axis 708. The actuator may be shifted to positions that are points parallel with the s-axis. Positions the actuator may be actuated to may be referred to as actuator positions, or range actuator positions if the actuator is a range shift actuator. The actuator positions of actuator may be recorded by a position sensor, such as position sensor 342 of FIG. 3 for actuator 222. The actuator positions may be continuously recorded and updated by a controller, such as ECU 322 of FIG. 3 for actuator 222. The positions of the first tooth 442 on the s axis 708 are proportional to and correspond with a shift position of the actuator. For purposes of discussion the positions on the s axis 708 of the first tooth may be considered the shift positions of the actuator, such as the shift positions of actuator 222.

The second tooth 444 may remain stationary at approximately the same point along the s axis 708. The distance of the s axis may be relative to a value of so 720. So 720 is a zero value corresponding with a start position, wherein the first tooth 442 and the corresponding engaging sleeve, such as engaging ring 352, are retracted to a minimum value by the actuator 222 of FIGS. 2-4. So 720 may be a neutral position, wherein the force is not transferred from the second tooth 444 to the first tooth 442, and vice versa. S axis 708 may also have a first threshold position and a second threshold position. The first threshold position is a first tooth contact position (Sn) 722. The second threshold position is an engagement threshold position (Se) 724. The first tooth contact position 722 may correspond with and may be the position wherein the neutral threshold position 500 of FIG. 5A occurs. The first tooth contact position 722 may be a neutral threshold position, and may be referred to as the neutral threshold position 722, herein. The engagement threshold position 724 corresponds with and may be the position wherein the engagement threshold position 540 occurs of FIG. 5B occurs. At all positions shown in the schematics 700, the first tooth 442 and second tooth 444 are retracted so that their respective clearances, e.g., the second clearance 358 and first clearance 344, are at a maximum. If the first tooth 442 and second tooth 444 are engaged at the engagement threshold position 724, backlash may be minimized during engagement of the engaging ring 352 with the engagement ring 356.

The schematics 700 may comprise schematic showing a first position 710, a schematic showing a second position 712, a schematic showing a third position 714, a schematic showing a fourth position 716, and a schematic showing a fifth position 718 of the first tooth 442 in relation to the second tooth 444. In the first position 710, the first tooth 442 may be retracted to the position of s0 720, wherein all features of the tooth are located before or at s0 720 relative to the s axis 708. The first tooth may be advanced a greater distance along the s axis between the first position 710 and second position 712. When in the second position 712, the first tooth 442 may be advanced along the s axis 708 and correspond with the first tooth contact position 722. At the second position 712 the first contact edge 512 may touch the second contact edge 514. The first tooth 442 may be advanced further along the s axis 708 from the s0 between the second position 712 and the third position 714. In the third position 714 the first tooth 442 may be in surface sharing contact with second tooth 444, via at least a leading surface of the first tooth 442 and at least a leading surface of the second tooth 444. Likewise, between the second position 712 and third position 714, a leading surface of the first tooth 442 may be in surface sharing contact with a leading surface of the second tooth 444. Additionally, between the third position 714 and the fourth position 716 the first position a leading surface of the first tooth 442 may be in surface sharing contact with a leading surface of the second tooth 444. For an example, the first leading surface 504 may be in surface sharing contact with the third leading surface 508 at the third position 714. In the fourth position 716, the first tooth 442 may be advanced along the s axis 708 and correspond with the engagement threshold position 724. The first tooth 442 may be advanced further along the s axis 708 between fourth position 716 and the fifth position 718. In the fifth position 718, the first tooth 442 may be in surface sharing contact with the second tooth 444 via at least a trailing surface the first tooth 442 and at least a trailing surface of the second tooth 444. Likewise, between the fourth position 716 and the fifth position 718, a trailing surface of the first tooth 442 may be in surface sharing contact with a trailing surface of the second tooth 444. For an example, the first trailing surface 532 may be in surface sharing contact with the fourth trailing surface 538 at the fifth position 718.

When in the third position 714, the $f_t$ 432 of FIG. 4 and leading surfaces of the first and second teeth 442, 444 may direct the $f_d$ 434 to be opposite the s direction 330. The $f_d$ 434 opposite to the s direction 330 may be shown as a first axial force ($f_{d1}$) 742. The first axial force 742 may push the first tooth 442 away from the second tooth 444 and toward s0 720. When in the fifth position 718, the $f_t$ 432 of FIG. 4 and leading surfaces of the first and second teeth 442, 444 may direct the $f_d$ 434 to be complementary to the s direction 330. The $f_d$ 434 complementary to the s direction 330 may be shown as a second axial force ($f_{d2}$) 744. The second axial force 744 may pull the first tooth 442 against the second tooth 444, and may therein lock the first tooth 442 with the second tooth 444. The second axial force 744 may occur at the fourth position 716 and may pull the first tooth 442 toward and into the fifth position 718.

The neutral threshold position 722 and engagement threshold position 724 may each serve as boundaries. The neutral threshold position 722 may act a boundary between a neutral zone where no force is applied to the first tooth 442 and a repulsive zone where a repulsive force is applied to the first tooth 442. Positions of s that are greater than the neutral threshold position 722 but less than the engagement threshold position 724, may be acted on by a repulsive force, such as the first axial force 742. The engagement threshold position 724 may act as a boundary between the repulsive zone and an attractive zone where an attractive force is applied to the first tooth 442. Positions of s that are greater than the engagement threshold position 724 may be acted on by an attractive force, such as the second axial force 744. This relationship is further illustrated in the graph and trace of FIG. 8 and schematics of FIGS. 10-12 described below.

Turning to FIG. 8, it shows a graph 800 comprising a first axis 804 and a second axis 806. The graph 800 comprises a trace of force vs position. The first axis 804 represents quantity amount $f_d$ 434. The second axis 806 is the distance from a start point of the first tooth 442 of FIG. 4. The value of the first axis 804 may be dependent on the second axis 806, such that as the distance on the second axis 806 changes the force of the first axis 804 may change. The second axis 806 may be the s axis 708 of FIG. 7 and the start point may be the SO 720. The first axis 804 includes negative and positive values each representing negative and positive amounts of the $f_d$ 434. The positive and negative values of on the first axis 804 are separated by the second axis 806, wherein the positive values of force are above the second axis 806 and negative values of force are below the second axis 806. A positive value of force on the first axis 804 may represents the $f_d$ 434 when complementary to the s direction 330 of FIG. 3. Likewise, a negative value of force on the first axis 804 may represent the $f_d$ 434 when opposite to the s direction 330 of FIG. 3. A positive force on axis 804 may pull or push the first tooth 442 away from the SO 720. A negative force may pull or push the first tooth 442 toward SO 720. The negative or positive force on the first tooth 442 may be cause by the $f_t$ 432 on the second tooth 444 and the position of the first tooth 442 relative to the second tooth 444 as described previously.

A trace 810 of graph 800 represents a function $f_d(s)$. $f_d(s)$ is the $f_d$ 434 produced by increasing the value of s: a distance of the first tooth 442 from the start point. As the trace 810 increases along the second axis 806, the force may increase or decrease in size and may change from negative to positive. The shape of the trace 810 may be used by an algorithm of the present disclosure to detect the engagement threshold position 724. For example, an engaging sleeve, such as engaging ring 352, hosting the first tooth 442 may be positioned iteratively to different stand-still positions along the second axis 806 from the SO 720, and observing the effect that applying a motor torque has on the position of the actuator that shiftingly couples to the engaging sleeve, such as actuator 222 of FIG. 2. For this example, in case of monotonically increasing tested positions, it is observed that over a certain point, the position sensor for the actuator, such as position sensor 342 of FIG. 3, does not show any repulsion when a torque from an electric machine is applied. At the point of no repulsion, the engage position, such as engagement threshold position 724 has been exceeded. A new testing position can be approximated as the average of the last two tested positions.

A plurality distances be positioned along the second axis 806 from s0 720, including a first distance 812, a second distance 814, a third distance 816, and a fourth distance 818. In order from closest to greatest distance from so 720 is the first distance 812, the second distance 814, the third distance 816, and the fourth distance 818. Between so 720 and the first distance 812, trace 810 shows approximately no $f_d$ 434 from the torque of an electric machine is placed on the first tooth 442. At the first distance 812 the first tooth 442 enters into a repulsive zone. The first distance 812 may be at the same distances as the neutral threshold position 722. Between the first distance 812 and second distance 814 the repulsive force may increase, resulting in a force that is increasingly negative pushing against the first tooth 442. At the second distance 814, the trace 810 is at a minimum and at a most negative value with respect to the first axis 804. At the second distance 814 the repulsive force against the first tooth 442 is at a maximum. Between the second distance 814 and the third distance 816 the $f_d$ 434 remains approximately the same, wherein the $f_d$ 434 is negative and an approximately constant repulsive force against the first tooth 442. At the third distance 816 the repulsive force of the second tooth 444 against the first tooth 442 begins to decrease. Between the third distance 816 and the fourth distance 818, the $f_d$ 434 may increase, becoming less negative and less repulsive. Between the third distance 816 and the fourth distance 818, may be the engagement threshold position 724. At the engagement threshold position 724 the $f_d$ 434 becomes approximately zero. At distances greater than the engagement threshold position 724, the $f_d$ 434 may be positive and attractive. At the engagement threshold position 724 the first tooth 442 enters an attractive zone. As the distance on the second axis 806 increases from the engagement threshold position 724 to the fourth distance 818, the attractive force may increase resulting in a force that is increasingly positive pulling against the first tooth 442. At the fourth distance 818 the trace 810 is at a maximum and at a most positive value with respect to the first axis 804. At the fourth distance 818 the attractive force against the first tooth 442 is at a maximum. After the fourth distance 818, the trace 810 may remain approximately constant with respect to the first axis 804.

The method of the algorithm of the present disclosure may search for the neutral threshold position 500 corresponding with the neutral threshold position 722 and the engagement threshold position 540 corresponding with the engagement threshold position 724. The method may be divided in to three distinct phases: a first phase for preparing the engaging component and engagement component for engagement, a second phase for searching for the neutral position, and a third phase for searching for the engagement position. The first phase may be referred to herein as a preparation phase. The second phase may be referred to herein as a neutral position search phase. The third phase may be referred to herein as engagement position search phase. Upon detecting a force against opposite to the shift direction at a prescribed position, the second phase may end, updating an engagement threshold position between the no-contact zone (e.g., the neutral zone) and a repulsive zone. The second phase may update the neutral threshold position as the prescribed position where the repulsive force is detected by the shifting of the actuator opposite to the shift direction. After the electric machine stalls, and the method of the third phase meets or exceeds a set number of iterations, the third phase may end, updating an engagement threshold position between the repulsive zone and an attractive zone. The third phase may update the engagement threshold position as the prescribed position detected when the electric machine stalls and the method of the third phase meets or exceeds a set number of iterations.

During the preparation phase, the first tooth 442, second tooth 444, and components physically or shiftingly coupled components thereto, such as the engaging ring 352, shifting rod 224, actuator 222, and the engagement ring 356, may be prepared such that the first tooth 442 may be used to search for the neutral position and the engagement position. The preparation phase may also be used to prepare the first tooth 442, second tooth 444, and physically or shiftingly coupled components thereto, such that the first tooth 442 may engage with the second tooth 444 and the clutch assembly 338 of FIG. 3 may be closed. The preparation phase may be comprised of a first step, a second step, and a third step. FIGS. 9A-9C show a plurality of arrangements of the simplified gear engagement schematic that may occur during the preparation phase. The preparation phase may minimize backlash that may occur during the search for the engagement position and during engagement at the engagement position.

Turning to FIG. 9A, it shows a first arrangement 910 of the simplified schematic 400. In the first arrangement 910, the engaging ring 352 may be in a first position 932 and the engagement ring 356 may be a second position 934 with respect to s axis 708. At the first arrangement 910, the engaging ring 352 and the first tooth 442 may be in a relaxed state. Likewise, the engagement ring 356 and the second tooth 444 may be in a relaxed state. At the first arrangement 910, there may be a first clearance 942 between the nearest wall of second groove 360 and the shift fork 336 of FIG. 3. Likewise, in the first arrangement 910, there may be a second clearance 944 between the nearest wall of the first groove 340 and the engagement ring 356. The first clearance 942 may be a clearance greater than a first minimum threshold of clearance between the second groove 360 and the shift fork 336. The second clearance 944 may be a clearance greater than a second minimum threshold of clearance between the first groove 340 and the engagement ring 356. When at the first position 932 the engaging ring 352 and the first tooth 442 may be at a position where s=0, such as $s_0$ 720 of FIG. 7. The first clearance 942 and the second clearance 944 may each be a functional clearance for their respective components. During the preparation phase, the first clearance 942 and second clearance 944 may be closed. When closed, the first clearance 942 may be reduced a first minimum clearance of a smaller distance. The first minimum clearance may be approximately zero or approximately a value that is as functionally close to a distance of zero as possible. Likewise, when closed, the second clearance 944 may be reduced to a second minimum clearance of a smaller distance. The second minimum clearance may be a distance that is approximately zero or approximately a value that is as functionally close to a distance of zero as possible.

The simplified schematic 400 may be in the first arrangement 910 during a first step and a second step of the preparation phase. During the first step the electric machine has null speed and torque. A driven shaft of the transmission 108 of FIG. 1 is locked. For this example, the driven shaft is the shaft 318. For an example, the shaft 318 may be locked via engaging a parking brake of the vehicle 100. For another example the shaft 318 may be locked via a dedicated device at the end-of-line. For the second step the dog clutch of the shaft 318, such as the clutch assembly 338 of FIG. 3, is positioned in a neutral position. At the neutral position the engaging ring 352 is disengaged from the engagement ring 356. The neutral position may be at the first arrangement 910. At the first arrangement 910, the actuator 222 does not transfer a force to shifting rod 224. At the first arrangement 910 an electric machine, such as electric machine 207, or another mover may not transfer torque to the shaft 318 or to a gear rotationally coupled to the engagement ring 356. For one example, during the first arrangement 910 the electric machine may be off, such as not to generate and transfer rotational energy via torque.

Turning to FIG. 9B-9C, FIG. 9B shows a second arrangement 950 of the simplified schematic 400, and FIG. 9C shows a third arrangement 970 of the simplified schematic 400. The second arrangement 950 and third arrangement 970 show the start and end, respectively, of the third step of the preparation phase. The third step of the preparation phase recovers the clearances of the clutch assembly and the idler gear, such that the clutch assembly may be engaged. When the clearances are recovered, each clearance is closed and reduced to a minimum value. For the example shown in the second arrangement 950 and third arrangement 970, the clearances to be minimized are the clearances of the second groove 360 and the engaging ring 352 and the first groove 340 and the engagement ring 356.

Turning to FIG. 9B, during third step of the preparation phase, the $f_s$ 436 may be transferred to the shifting rod 224 via the actuator 222 as shown in the second arrangement 950. The forces arising from the deflection of force via the helix angles of the gear complementary and physically coupled to the engagement ring 356 may be exploited to reduce the distance of the second clearance 944. The $f_s$ 436 may actuate the shifting rod 224. The actuation of the shifting rod 224 may actuate a coupling to the first engaging ring 352, such as the shift fork 336. The shifting of the coupling may reduce the distance of the first clearance 942. The $f_s$ 436 may reduce the distance of the first clearance 942 in a same direction along the s axis 708, such as the s direction 330 of FIG. 3, with each iteration of the first phase. Likewise, the electric machine 207 may generate a rotational speed and a torque. The torque from the electric machine 207 may be transferred to the engagement ring 356. The torque may apply the $f_t$ 432 and the $f_a$ 346 to the engagement ring 356 as shown in the second arrangement 950. The $f_a$ 346 may be generated from the transfer and deflection of $f_t$ 432 by helix angles of a gear that physically couples to the engagement ring 356, such as the second gear 334 of FIG. 3. The $f_a$ 346 may reduce the distance of the second clearance 944. The $f_a$ 346 may reduce the distance of the second clearance 944 in a same direction along the s axis 708, such as the s direction 330 of FIG. 3, with each iteration of the first phase.

Turning to FIG. 9C, the end of the third step of the preparation phase is shown in the third arrangement 970. In the third arrangement 970 there may be a third clearance 972 between the nearest wall of second groove 360 and the shift fork 336. Likewise, in the third arrangement 970, there may be a fourth clearance 974 between the nearest wall of the first groove 340 and the engagement ring 356. The third clearance 972 may be a minimum threshold of clearance for the engaging ring 352, such that the engaging ring 352 may engage with the engagement ring 356. The third clearance 972 may be the minimum threshold of clearance for the engaging ring 352, such that the first tooth 442 of the engagement ring may be used in the neutral position search phase and the engagement position search phase. The fourth clearance 974 may be a minimum threshold of clearance for the engagement ring 356, such that the engaging ring 352 may engage with the engagement ring 356. The third clearance 972 may be the minimum threshold of clearance for the engaging ring 352, such that the second tooth 444 of the engagement ring 356 may be used in the neutral position search phase and the engagement position search phase. The preparation phase closes the clearances in a determined direction, defining in this way a well determined measurement origin. The third clearance 972 may be a first measurement origin for the engaging ring 352 and by extension the actuator 222, such as when the engaging ring 352 and the actuator 222 are positioned at s0. The fourth clearance 974 may be a first measurement origin for the engagement ring 356. The third clearance 972 may be a first measurement origin for the first tooth 442, such as when the first tooth 442 is positioned at s0. The fourth clearance 974 may be a first measurement origin for the second tooth 444.

The minimization of the first clearance 942 to the third clearance 972 may minimize backlash for the engaging ring 352 when searching for an engagement position or engaging at an engagement position. The minimization of the first clearance 942 in distance to the third clearance 972 may close the first clearance 942. The minimization of the second clearance 944 to the fourth clearance 974 may minimize backlash for the engagement ring 356 when searching for an engagement position or engaging at an engagement position. The minimization of the second clearance 944 in distance to the fourth clearance 974 may close the second clearance 944.

In the third arrangement 970, the electric machine 207 may continue generate the rotational speed and the torque that may be transferred to the engagement ring 356. The $f_a$ 346 from the torque may be applied to the engagement ring 356 to maintain the fourth clearance 974 at approximately the same distance.

Turning to FIGS. 10-12, illustrate three events that may occur during the neutral position search phase and the engagement position search phase. FIGS. 10-12 comprise and share plurality of zones that the first tooth 442 may be positioned in relative to the second tooth 444 and the s axis 708. FIGS. 10-12 have a three zones in the form of first zone 1012, a second zone 1014, and a third zone 1016. The first zone 1012 is a no contact zone, wherein there may be no force applied to features of the first tooth 442 from the second tooth 444. Alternatively, the first zone 1012 may be referred to as a neutral zone. The second zone 1014 and third zone 1016 are a repulsive zone and an attractive zone, respectively. In the second zone 1014 repulsive force may be applied to features of the first tooth 442 from the second tooth 444. In the third zone 1016 attractive forces may be applied to features of the first tooth 442 from the second tooth 444.

Turning to FIG. 10, a first event 1000 is shown. During the first event 1000, the first tooth 442 may be at first position 1010 on the s axis 708. The first position 1010 may be a position where the entirety of the first tooth 442 is in the first zone 1012. In the neutral position search phase and the engagement position search phase, the electric machine 207 may transfer torque to and drive the rotation of the engagement ring 356 of FIGS. 2-3. A tangential force 1020 may be produced the torque and be applied to the second tooth 444. The tangential force 1020 may be the tangential force 432 of FIG. 4.

FIG. 11 illustrates a second event 1100 is shown. During the second event 1100, the first tooth 442 may be at second position 1110 on the s axis 708. The second position 1110 may be a position features and components of first tooth 442 are in the second zone 1014. When features of first tooth 442 are positioned in the second zone 1014, some of the features of the first tooth 442 may have surface sharing contact with the second tooth 444; however, the first tooth 442 may be pushed away from the second tooth 444 by a first axial force 1122. The first axial force 1122 may be generated from the torque transferred from the electric machine 207 to the engagement ring 356 of FIGS. 2-3. The first axial force 1122 is a repulsive force that is opposite to the s direction along the s axis 708. The first axial force 1122 may be shown mathematically as a negative value for use in the algorithm. The first axial force 1122 may be the first axial force 742 of FIG. 7. The features of the first tooth 442 in the second zone 1014 may be pushed into the first zone 1012 by the first axial force 1122.

FIG. 12 illustrates a third event 1200 is shown. During the third event 1200, the first tooth 442 may be at a third position 1210 on the s axis 708. The third position 1210 may be a position features and components of first tooth 442 are in the third zone 1016. When features of first tooth 442 are positioned in the third zone 1016, some of the features of the first tooth 442 may have surface sharing contact with the second tooth 444. When in the third zone 1016, the first tooth 442 may be pulled by a second axial force 1222. The second axial force 1222 may be generated from the torque transferred from the electric machine 207 to the engagement ring 356 of FIGS. 2-3. The second axial force 1222 may pull the first tooth 442 such that more features of the first tooth 442 have surface sharing contact with the second tooth 444. The second axial force 1222 may pull the first tooth 442 to lock with the second tooth 444. Likewise, the tangential force 1020 may push the second tooth 444 against the first tooth 442, and may lock the second tooth 444 against the first tooth 442. The second axial force 1222 is an attractive force that is complementary to the s direction along the s axis 708. The first axial force 1122 may be shown mathematically as a positive value for use in the algorithm. The second axial force 1222 may be the second axial force 744 of FIG. 7.

Turning to FIG. 13, it shows a method 1300. Method 1300 is a first method of calibrating and engaging a clutch of the present disclosure. Method 1300 may be used to calibrate a clutch assembly that may be of a dog clutch configuration, such as the clutch assembly 338 of FIG. 3. Method 1300 may calibrate an ECU, such as ECU 322, such that the ECU may selectively couple engaging component and engagement component of the clutch assembly to minimizing grinding, vibrations, noise, and backlash during engagement. The engaging component may be the engaging ring 352 and the engagement component may be engagement ring 356 of FIG. 3. The method 1300 may estimate a neutral threshold position, such as the neutral threshold positions 500, 722 of FIGS. 5A and 7. The method 1300 may estimate an engagement threshold position, such as the engagement threshold positions 540, 724 of FIGS. 5B and 7. When ECU is calibrated, e.g., when the neutral threshold position and the engagement threshold position are estimated and recorded by method 1300, the teeth of the engaging component may engage teeth of the engagement component engage at the engagement threshold position. Likewise, when the ECU is calibrated via method 1300, the teeth of the engaging component may not engage teeth of the engagement component engage at neutral threshold position or at a position between the neutral threshold position and engagement threshold position. After method 1300, the ECU or another control unit may prevent the engaging component actuating and attempting engagement with the engagement component at or before the neutral threshold position, e.g., in the neutral zone or no contact zone. After method 1300, the ECU or another control unit may prevent the engaging component from actuating and attempting engagement with the engagement component between the neutral threshold position and the engagement threshold position, e.g., in the repulsive zone. After method 1300, the ECU or another control unit may actuate the engagement component to a position greater than the engagement threshold position The teeth of the engaging component may include the first tooth 442. The teeth of the engagement component may include the second tooth 444. The Method 1300 may use a linear heuristics method, wherein each iteration the new candidate position is monotonically increased by a predetermined step size. However, alternative methods using the steps of method 1300 may use a nonlinear heuristics method, such as binary heuristics method, to determine a new candidate position. If a binary heuristics method is used, for iteration the range between the lowest position and highest position is halve by setting a new candidate position at a midpoint. Counters for iteration candidates may be represented by the letters k, j, and i.

Method 1300 starts and proceeds to 1302. At 1302 the operating conditions are determined, such that a control system comprising a controller or plurality of controllers, such as the ECU 322, may adjust conditions of the vehicle for the following steps of method 1300. At 1312 the clutch is initialized in a preparation phase for searching for the neutral threshold position and the engagement threshold position.

The preparation phase shown in 1302 comprises a plurality of sub steps. 1302 may begin at 1314. At 1314 the driven shaft, such as shaft 318, that the clutch assembly may selectively couple to is locked. The driven shaft may be locked via a dedicated device at the end-of-line or by engaging a parking brake. At 1314 the electric machine, such as the electric machine 207, may have a null speed and torque such as to not transfer torque to the gearset selectively coupled to the driven shaft by the clutch assembly. From 1314, 1302 continues to 1316, where the counters for iteration candidates are set to their starting values. For example, the first counter k is set equal to 0, the second counter j is set equal to 1, and the third counter i is set equal to 0. From 1316, 1302 continues to 1318. At 1318, the clutch assembly is set to a neutral position. The neutral position may be a position where the s is distance less than a neutral threshold position, such as the neutral threshold position 500 or neutral threshold position 722, along a shift axis, such as s axis 708. At the neutral position the distance of s of the engaging component is set to an s0 value. From 1318, 1302 may proceed to 1320. At 1320 the clearances of the engaging component and the engagement component are minimized. 1320 comprises a plurality of sub steps. Sub steps comprised by 1320 include 1322 and 1324. At 1322 the clearance of the engagement ring, such as clearance 944 of FIG. 9A, is reduced to a minimum clearance, such as the fourth clearance 974 of FIG. 9C. At 1322 the electric machine may generate a rotational speed and torque, and transfer the rotational energy via torque to the engagement ring. The torque may produce a tangential force and an axial force, such as the $f_t$ 432 and the $f_a$ 346 of FIGS. 3-4. The axial force may reduce the clearance of the engagement ring to the minimum clearance. At 1324 clearance of the engagement ring, such as clearance 942 of FIG. 9A, is reduced to a minimum clearance, such as the third clearance 972 of FIG. 9C. At 1324 the clearance of the engagement ring may be reduced via shifting force, such as $f_s$ 436 of FIG. 4.

The first step of the preparation phase may comprise 1314, 1316. The second step of the preparation phase may comprise 1318. The third step of the preparation phase comprises 1320. The process of the preparation phase may be shown visually via schematics through the first arrangement 910, second arrangement 950, and third arrangement 970 of FIGS. 9A-9C. The clutch assembly during 1314, 1316, and 1318 may be shown schematically via the first arrangement 910. The clutch assembly at the start of 1320 may be shown schematically via the second arrangement 950. The clutch assembly at the end of 1320 may be shown schematically via the third arrangement 970.

After 1312, method 1300 proceeds to 1332. At 1332 the method 1300 may near the repulsive zone. During the process of nearing the repulsive zone in 1332, the method 1300 may search for and estimates the neutral threshold position. 1332 may comprise neutral position search phase. After 1332, method 1300 may proceed to 1342. At 1342, method 1300 searches for the and estimates the engagement threshold position. 1342 may comprise the engagement position search phase. The engagement threshold position may be the position where the engage point may be set for engaging the clutch assembly. After 1342, method 1300 may proceed to 1352. At 1352, the method 1300 may engage the clutch assembly, such that the clutch assembly rotationally couples an idler gear to the driven shaft. At 1352 the clutch is engaged at the engagement position. 1352 may comprise a sub step at 1354. At 1354, the engagement position is calculated and recorded. The engagement position may be based on the position where the engagement threshold position is detected. The engagement position may be calculated from a third equation. The third equation estimates a prescribed position for the engagement position from the sum of P1, P2 multiplied with a value of one subtracted from the value of the k counter, and P6 multiplied by the j counter.

$$\text{Engagment Position} = s = P1 + P2*(k-1) + P6*j \qquad \text{Equation 3:}$$

In equation 3, s is the position of the engaging component; P1 a lower limit of a candidate position; P2 is a first step size, and P6 is a second step size. The first step size P2 is a rough step size based on initial estimates. The second step size P6 is a thinner step size compared to P2.

After 1354, method 1300 may leave 1352 and ends.

1332 and 1342 comprise sub methods of method 1300. The steps of 1332 may be shown and expanded upon in a method 1400 in FIG. 14. Likewise, the steps of 1342 may be shown and expanded upon in a method 1500 in FIG. 15.

Turning to FIGS. 13-15, method 1300, method 1400, and method 1500 uses a plurality of variables, such as P1, P2, P3, P4, P6, and P7. P1, P2, and P6 are described with reference to equation 3, wherein P1 is the lower limit of the candidate position; P2 is the first step size, and P6 is the second step size. For method 1400 P1 is determined by stack tolerance analysis and as such it is calculated off-line and not by the software logic. For an example of method 1500, P1 may be the neutral threshold position determined from method 1400. For another example of method 1500, may be the value of P1 determined via the stack tolerance analysis used for method 1400. P3 is an electric machine rotational speed target value, that an electric machine, such as electric machine 207 of FIG. 2, increase the rotational speed to a selected speed to drive an engagement component and complementary gear, such as the engagement ring 356 and the second gear 334 of FIG. 3. The electric machine may be brought to the selected rotational speed of P3 during engagement and/or during evaluation of the neutral threshold position or the engagement threshold position. P4 may be the time that rotational speed of the electric machine may be commanded to P3. P5 is the torque that the electric machine may output to a gear set, such as a stage that comprises partial gear set 314, that may drive the engagement component and the complementary gear. P6 may be a second step size. P6 may be a thinner step size compared to the P2. P7 is a fixed value and a set number of iterations that may occur during a method without resetting the i counter. The first counter k may be a position counter based on distance. The first counter k may be used in conjunction and iteratively with P1 and P2. The second counter j may be used in conjunction and iteratively with the P1, P2, P5, and P6. The third counter i may be used with P7 to evaluate whether the method 1300 stops. If i is less than P7 the engagement point search phase of method 1300 may continue. If i is greater than P7 the search for the engagement point search phase of method 1300 may end after a completion of that instance. P7 may therein be used to confirm an engagement point, such as an engagement threshold position 540 or engagement threshold position 724. The second phase, method 1400, may be responsible for finding the repulsive zone and updating the neutral threshold position for the control unit of the actuator. The third phase, e.g., method 1500, may be responsible for finding the attractive zone and updating the engagement threshold position for the control unit of the actuator.

Turning to FIG. 14, it shows method 1400. Method 1400 is a method to approach a repulsive zone and search for the neutral point between the teeth of the engagement sleeve and the teeth of the engagement ring. The neutral point may be a neutral threshold position, such as the neutral threshold positions 500, 722 of FIGS. 5A and 7. Method 1400 begins at 1402. At 1402 the position 1402 position the RSA of the clutch assembly, such as the actuator 222 of FIG. 2, is placed in neutral position. The neutral position may place the engaging component at a start point where s is a zero value (e.g., approximately s=0 mm) such on an s axis. For example, the neutral position may be S0 720 on the s axis 708 of FIG. 7. The neutral position may be in a no contact zone (e.g., a neutral zone), such as the first zone 1012 of FIG. 10. At the start of method 1400, the neutral position is not the neutral threshold position. When the neutral threshold position is found, the neutral threshold position may be recorded by a control unit, such as ECU, such as ECU 322 of FIG. 3. After method 1400 and method 1500, the neutral threshold position may be used as a maximum distance for a neutral position when engaging the clutch.

After 1402, method 1400 proceeds to 1404. At 1404, the RSA is positioned such that the engaging component is at a first prescribed position. The first prescribed position may be a point on an s axis, such as s axis 708. The first prescribed position may be the sum of P1 and P2 represented by a fourth equation.

$$s_1 = s = P1 + P2*k_i \qquad \text{Equation 4:}$$

In equation 4, $s_1$ is the first test position, and $k_i$ is the current instance and value of the k counter.

After 1404 method 1400 proceeds to 1406. At 1406, the torque of the electric machine is limited to P5, such that the torque generated by the electric machine may not be greater than P5. The torque of the electric machine may be limited to P5 by a control system that may control the electric machine and the clutch assembly. The control system may comprise the ECU. If the torque is greater than P5, the control system may reduce the torque of the electric machine to P5. After 1406, method 1400 proceeds to 1408. At 1408, the electric machine is commanded by the control system via control signals to a selected rotational speed equal to P3. Likewise, at 1408 the electric machine is commanded to operate at a rotational speed P3 for a period of time P4, via the control signals.

After 1408 method 1400 proceeds to 1410. At 1410 the electric machine is evaluated by sensors and the control system to determine if the output spins. If spin is not detected from the electric machine (1410 is NO), the electric machine stalls. When the electric machine stalls, the attractive zone has been found and entered by the engaging component. After the electric machine stalls, method 1400 proceeds to 1412. The engagement component may be physically coupled to a gear may be selectively coupled to the shaft via the clutch comprising the engaging and engagement components. The stall of the electric machine and the shaft may be caused by the locking of an output shaft via a device, such as a via a parking brake or an end of line device. Rotationally coupling the electric machine to a locked output shaft, such as via the clutch assembly, may cause the electric machine to stall. For an example, the output shaft locked may be the shaft that may host the gear and engagement component. As the shaft, the output shaft may be complementary to the engagement component and the complementary gear of the engagement component, such that the clutch may rotationally couple the complementary gear to the output shaft when engaged. Alternatively, the output shaft may be rotationally coupled to the shaft. The shaft is complementary to the complementary gear of the engagement component, such that the complementary gear is rotationally coupled to the shaft when the clutch is engaged. For either of the above examples, the park brake or the end of line device prevents rotation of the shaft selectively coupled via the clutch comprising the engaging component and engagement component.

At 1412 the value of P2 is reduced. For example, at 1412 the value of P2 may be reduced for one example in a linear method, wherein the step size of P2 is reduced by an arbitrary step size. For another example, at 1412 the value of P2 may be reduced in a non-linear manner, such as a binary method. After 1412, method 1400 may proceed to 1414. At 1414 the k counter is reset to a value of zero from the previous value of the k counter at 1414. After 1414, method 1400 returns to 1402.

Returning to 1410, if a spin is detected from the electric machine (1410 is YES), the electric machine does not stall and the method 1400 proceeds to 1422. At 1422 the control system determines if the RSA and the shifting rod has been moved backward, e.g. opposite to the s direction 330 of FIG. 3. The control system may use data from position sensors, such as the position sensor 342, to evaluate the RSA. If the RSA has been detected moving backward (1422 is YES), the repulsive zone has been found and the method 1400 proceeds may end. The previously prescribed value before the prescribed value may be used as the neutral threshold position.

For example, the RSA may be set to a first test position and a second test position. The first test position may be the position tested immediately before the second test position (e.g., the first test position is the previously prescribed value and the second position is the prescribed value). The second test position is greater than the first test position by an increment of P2. When at the first test position, the RSA is not detected moving backward, such as if 1422 is NO. When at the second test position, the RSA is detected moving backward, such as if 1422 is YES. The method 1400 may stop and the first test position may be set as a neutral threshold position. The neutral threshold position may therein be a previously tested position before a tested position where a repulsive force is detected.

For an alternative example, an optional step may be performed before method 1400 ends after the RSA has been detected moving backward (e.g., 1422 is YES). During the optional step, a control unit, such as ECU 322, may record the previously prescribed value. The ECU may update the neutral threshold position as the previously prescribed value. After the optional step, method 1400 ends.

The repulsive zone may be the second zone 1014 of FIGS. 10-12. The position prior to the position where the repulsive zone is first detected, e.g., the position at the last prescribed value, is a neutral threshold position, such as the neutral threshold positions 500, 722. The neutral threshold position may be used in the next steps in method 1500 of FIG. 15 to find the repulsive zone and an engagement threshold position. The memory of the controller system may store and update the neutral threshold position for use in subsequent engagement and/or disengagement of the clutch, such as engaging the clutch in 1352 of FIG. 13. The actuator of the clutch, such as actuator 222 of FIG. 2, may be responsive to the updated neutral threshold position via commands from the controller system. For an example, the updated neutral threshold position may be used as a neutral position during engagement and/or disengagement of the clutch. For this or another example, the updated neutral threshold position may also be a maximum neutral position that the actuator may not exceed when actuating to a neutral position.

Returning 1422, if the RSA has not been detected moving backward (1422 is NO), the repulsive zone has not been found and the method 1400 proceeds to 1432. At 1432, the method 1400 directs the electric machine to reduce the rotational speed and the torque output to zero. The electric machine may be controlled by the control system to a zero speed and a zero torque by a command signal generated by the controller. After 1432, the method 1400 proceeds to 1434. At 1434, the value of the k counter is increase by a unit of one.

$$k_i = k_{i-1} + 1 \qquad \text{Equation 5:}$$

In equation 5, $k_i$ is an integer and the new instance of the value of the k counter and $k_{i-1}$ the previous value of the k counter. The k counter may be increased by a factor of one with each iteration.

After 1432 the method 1400 returns to 1402. With each adjustment or return to the neutral position in 1402, the third step of the preparation phase may be repeated, such that the clearances of the engaging component and engagement component are minimized. For example, the third step of the preparation phase may be repeated after each instance of 1414 and 1434. 1402 of method 1400 may include performing the clearance reduction step for the clutch assembly at 1320 of method 1300 with each iteration. A plurality of prescribed positions may be tested for the first prescribed position via method 1400.

Turning to FIG. 15, it shows method 1500. Method 1500 is a method to search for the engagement point between the teeth of the engagement sleeve and the teeth of the engagement ring. The engagement point may be an engagement threshold position, such as the engagement threshold positions 540, 724 of FIGS. 5A and 7.

After starting, method 1500 proceeds to 1502. At 1502 method 1500 places the RSA in a neutral position. RSA is the RSA described in FIG. 14. Likewise, the neutral position is the neutral position described in FIG. 14. As an example the neutral position may be set such that s is 0 mm. The RSA may move the engaging component to different positions via a commands from the control system. From 1502, method 1500 proceeds to 1504. At 1504, the RSA is positioned such that the engaging component is at a second prescribed position. The second prescribed position may be a point on an s axis, such as s axis 708. The second prescribed position may be estimated via a sixth equation. The sixth equation estimates the second prescribed position from the sum of P1, P2 multiplied with a value of one subtracted from the value of the k counter, and P5 multiplied by the j counter.

$$s_2=s=P1+P2*(k_i-1)+P6*j \qquad \text{Equation 6:}$$

In equation 6, $s_2$ is the second test position.

A plurality of prescribed positions may be tested for prescribed position s2 in method 1500. A neutral threshold position, such as neutral threshold positions 500, 722, found in method 1400 may be the minimum value of a range of prescribed positions for $s_2$. As the lowest value of $s_2$, the neutral threshold position may prevent engagement of the clutch in the neutral zone. The engaging component may be the engaging component described in method 1400, such as for example the engaging ring 352 of FIG. 3. The engagement component may be the engagement component described in method 1400, such as for example the engagement ring 356 of FIG. 3.

After 1504, the method 1500 proceeds to 1506. At 1506, the torque of the electric machine is limited to P5, such that the torque generated by the electric machine may not be greater than P5. The torque of the electric machine may be limited to P5 by a control system that may control the electric machine and the clutch assembly. The control system may comprise an ECU, such as ECU 322 of FIG. 3. If the torque is greater than P5, the control system may reduce the torque of the electric machine to P5. After 1506, method 1500 proceeds to 1508. At 1508, the electric machine is commanded by the control system via control signals to a selected rotational speed equal to P3. Likewise, at 1508 the electric machine is commanded to operate at a rotational speed P3 for a period of time P4, via the control signals. The electric machine and the output of the electric machine may be requested to spin about an axis via the command signals to start and/or increase the rotational speed of the electric machine.

After 1508 method 1500 proceeds to 1512. At 1512 the electric machine is evaluated by sensors and the control system to see if the output spins. If spin is not detected from the electric machine (1512 is NO), the electric machine stalls. The stall of the electric machine and the shaft may be caused by the locking of an output shaft via a device, such as a parking brake or an end of line device. Rotationally coupling the electric machine to a locked output shaft, such as via the clutch assembly, may cause the electric machine to stall. The output shaft locked may be the shaft complementary to the engagement component, such as shaft 318 of FIG. 3, where the complementary shaft hosts the gear and engagement component. The engagement component selectively couples to the complementary shaft when the clutch assembly is closed. Likewise, the output shaft may be a separate shaft from the complementary shaft to the engagement component, but rotationally couple to the complementary shaft to the engagement component, such as via a gear set. The engagement component may be physically coupled to a gear. The gear may be positioned about and supported by the complementary shaft. The engagement component may be selectively coupled to the complementary shaft via the engaging component. When the electric machine has stalled, the attractive zone has been found and entered by the engaging component, and method 1500 proceeds to 1514. At 1514 the third counter i is increased by a unit of 1. The increase in the i may be represented by a seventh equation.

$$i_i=i_{i-1}+1 \qquad \text{Equation 7:}$$

In equation 7, $i_i$ is an integer and the new instance of the value of the i counter, and $i_{i-1}$ the previous value of the i counter. The i counter may be increased by a factor of one with each iteration.

After 1514, method 1500 may continue to 1516. At 1516 the value of i is compared against P7. If the value of i is greater than or equal to P7 (1516 is YES), method 1500 ends. Upon ending the values of i, k, and j from the final iteration may be recorded by a control unit and used to calculate the engagement threshold position at 1354 and engage at the engagement point 1352 of method 1300 of FIG. 13. Therein the last $s_2$ position of 1504 may be recorded as and used by the control unit as the engagement threshold positon.

Returning to 1516, if the value of i is less than P7 (1516 is NO), method 1500 may proceed to 1518. At 1518 the method 1500 directs the electric machine to reduce the rotational speed and the torque output to zero. The electric machine may be controlled by the control system to a zero speed and a zero torque by a command signal generated by the control unit. After 1518, method 1500 returns to 1502. The steps of method 1500 may reiterate a plurality of times until i is greater than or equal to P7.

The memory of the controller system may store and update the engagement threshold position with subsequent engagement and/or disengagement of the clutch, such as engaging the clutch in 1352 of FIG. 13. The actuator of the clutch, such as actuator 222 of FIG. 2, may be responsive to the updated engagement threshold position via commands from the controller system. For an example, the updated engagement threshold position may be used as an engagement position during engagement and/or disengagement of the clutch. For this or another example, the updated engagement threshold position may also be a minimum value for an engagement position, that the actuator may meet or exceed when actuating to an engagement position.

Returning to 1512, if the electric machine does spin (1512 is YES), the electric machine does not stall. When the electric machine does not stall, the attractive zone has not been found or been entered by the engaging component, and method 1500 proceeds to 1532. At 1532, the method 1500 directs the electric machine to reduce the rotational speed and the torque output to zero. The electric machine may be controlled by the control system to a zero speed and a zero torque by a command signal generated by the controller. After 1532, the method 1400 proceeds to 1534. At 1534, the value of the j counter is increase by a unit of one. The increase in j may be shown in an eighth equation.

$$j_i=j_{i-1}+1 \qquad \text{Equation 8:}$$

In equation 8, $j_i$ is an integer and the new instance of the value of the j counter, and $j_{i-1}$ the previous value of the j counter. The j counter may be increased by a factor of one with each iteration.

After 1534, method 1500 may continue to 1536. At 1536 the i value is evaluated, such that the i value is compared to a value of 0 to evaluate if the i value is not equal to 0 (e.g., i!=0). If the i is equal to 0 (1536 is NO), method 1536 may return to 1502. Returning to 1536, if i is not equal to zero, (e.g., i!=0), (1536 is YES), method 1500 proceeds to 1538. At 1538 the i counter is reset to be equal to 0. After 1538, method 1500 returns to 1502. The steps of method 1500 may reiterate a plurality of times until i is greater than or equal to P7 and the electric machine stalls, such as when 1516 is YES.

With each adjustment or return to the neutral position in 1502, the third step of the preparation phase may be repeated, such that the clearances of the engaging component and engagement component are minimized. For example, the third step of the preparation phase may be repeated after each instance of 1536, 1538, and 1518. 1502 of method 1500 may include performing the clearance reduction step for the clutch assembly at 1320 of method 1300 of FIG. 13 with each iteration.

A method of the present disclosure, such as method 1300 of FIG. 13, may search positions for each first tooth of the first teeth and each second tooth of the second teeth, such as the neutral position and the engagement position. The method may be divided into three phases: a first phase for preparing the engaging component and engagement component for engagement, a second phase for searching for the neutral position, and a third phase for searching for the engagement position. When searching for the neutral position and/or the engagement position the first tooth may be positioned at distances away relative to a disengaged position to positions about the second tooth.

During the second phase: the neutral zone search, the first tooth may be positioned in a plurality of zones, such as a no contact zone, a repulsive zone, or an attractive zone while the method searches for the neutral position and engagement position for the engaging component and first tooth to be positioned relative to the second tooth. Each of the zones may correspond with a different event that may occur for the engaging component and first tooth. In when the engaging component is in the no contact zone (first zone), a first event may occur where the first tooth and second tooth are not touching, and the RSA is not moved. When the engaging component is in the repulsive zone, the axial force of the electric motor is greater than the force of the RSA. In the repulsive zone, when the first tooth and second tooth touch, the first tooth and the engaging component are pushed away by a force from the second tooth and engagement component. The force that pushes the first tooth and engagement component may push the actuator, such that the actuator may move in a direction opposite to the shift direction. The movement of the actuator, such as an RCA, may be detected by the control unit, such as via position sensors monitoring the actuator and communicatively couple to the control unit. The detection of movement by the control unit may indicate the actuator entered the repulsive zone, and may be used by the algorithm to adjust the neutral and engagement position of the first tooth and the engaging component. When the engaging component is in the attractive zone the clutch may engage, such that the first tooth and second tooth may lock with one another. The tangential force of the second tooth and force of the RSA may press the first tooth against the second tooth to be in surface sharing contact. The tangential force of the engagement component and the negative angle of the second tooth may lock the first tooth with the second tooth. The locking may stall the shaft and rotation of rotational elements rotationally coupled to the engagement component. Stalling of the shaft may be detected by the control unit, such as via sensors monitoring the rotation of the shaft or the output of the electric machine that are communicatively coupled to the control unit. During the search for the neutral zone the locking may be recorded and the controller may adjust the prescribed position for testing the neutral threshold position and the repulsive zone. When the controller calibrates the RSA and the clutch assembly, and the repulsive zone search is properly calculated, the third event may be prevented from occurring during the search for the repulsive zone. Whether the first, second, or third event occurs, the electric machine is commanded to a rotational speed of zero and the RSA is moved back to a rest position, e.g., SO position. Disengagement of the first tooth and second tooth, and by extension the engaging component and engagement component, is performed if the third event occurs. Once moved back to SO, the clearances of the engaging component and engagement component are minimized as in the first phase, and the second phase is repeated for a new candidate position. The second phase may be repeated. The control unit may perform the detection and stop the electric machine below a minimum threshold of time, such that grinding, waring, noise, and other forms of degradation are minimized during the second phase. Each new position is selected via the linear search method of the first embodiment or the binary search method of the second embodiment. The minimum distance between the two candidates is below a first minimum threshold of distance dependent upon the last measurement. The iterations may continue until the difference between the greater position and the lower position is equal to or lower than a second minimum threshold of distance, such as a maximum allowable tolerance or value of error.

During the third phase: the engagement zone search, the first tooth, and by extension the engaging component, may be positioned in a plurality of zones, such as the repulsive zone or the attractive zone described above. During the third phase a first event or a second event may occur. During the first event the engaging component is in the repulsive zone but not the attractive zone. During the first event the axial force resulting from electric motor overcome the force that the RSA can apply, the axial force from the electric machine is able to push back the RSA and can hold its speed. The first event may cause grinding of the first tooth and second tooth, and by extension the gear of the clutch. The second event may occur when the engaging component is in the attractive zone. When the engaging component is in the attractive zone, the clutch engages. The tangential force of the engagement component and the negative angle of the second tooth may lock the first tooth with the second tooth, therein locking the engaging component to the engagement component. The electric motor may be stalled and the condition of locking of the engaging component and engagement component is recorded by the controller unit. Whether the first or second event occurs, the electric machine is commanded to a rotational speed of zero and the RSA is moved back to a rest position, e.g., SO position. Once moved back to SO, the clearances of the engaging component and engagement component are minimized as in the first phase, and the third phase is repeated for a new candidate position. The third phase may be repeated. The control unit may perform the detection and stop the electric machine below a minimum threshold of time, such that grinding, waring, noise, and other forms of degradation are minimized during the second phase. Each new position is selected via the linear search method of the first embodiment or the binary search method of the second embodiment. The minimum distance between the two candidates is below a first minimum threshold of distance dependent upon the last measurement. The iterations may continue until the difference between the greater position and the lower position is equal to or lower than a second minimum threshold of distance, such as a maximum allowable tolerance or value of error.

In another representation the method of the present disclosure includes a twenty second example, wherein the driven shaft may be locked via a dedicated end-of-line device. In another representation the method of the present disclosure includes a twenty third example, wherein the driven shaft may be locked via a parking brake.

In this way, a method may calibrate a control unit and a dog clutch, such that an engaging component may engage with an engagement component to prevent or minimizes grinding. The preparation phase for the method may reduce the effect of backlash during the searching phases of the method. When calibrated force applied to the engaging component from the engagement component that is opposite to a shift direction for the clutch may be prevented. The method may calibrate the control unit and dog clutch, by finding a first threshold position and a second threshold position for the teeth of the dog clutch. The first threshold position is a first point and the second threshold position is a second point on an axis the clutch may be shifted parallel to, referred to as a shift axis. The first threshold position may be a neutral threshold position between a first zone and a second zone along the shift axis. The second threshold position may be an engagement threshold position between the second zone and a third zone. The first zone may be a distance along the shift axis where features of the first teeth may not be in surface sharing contact with the second teeth. The second zone and third zone may be a distance along the shift axis where feature of the first teeth may be in surface sharing contact with the second teeth. In the second zone, features of the first teeth in surface sharing contact with features of the second teeth may receive a repulsive force. The repulsive force may push the first teeth from the second teeth. In the third zone, features of the first teeth in surface sharing contact with features of the second teeth may receive an attractive force. The attractive force may pull the first teeth to abut and lock with the second teeth. The identification of the neutral threshold position and engagement threshold position may allow for the second zone and third zone to be identified, such that when the control unit, actuator, and clutch assembly are calibrated via the method, the engaging component may be engaged at the third zone. Not engaging at the second zone, such as if an actuator force greater than the axial force were used to force engagement from the second zone, may prevent grinding between the components of the clutch assembly, such as grinding that caused directly or indirectly by the repulsive force. Additionally, not engaging at the second zone may prevent grinding between rotational elements of the gearset complementary to the clutch assembly. The method may allow for the control unit and actuator to be calibrated to actuate the clutch assembly using an end of line device or a parking brake to lock the driven shaft. The method may be used to recalibrate the control unit and actuator to actuate the clutch assembly, as the features of the clutch assembly change. For example, features of the clutch assembly may change if components of the clutch assembly are replaced or degrade. The control unit may be an electronic control unit (ECU). In another representation, a system is provided. The system may include motor, and a processor with instructions stored in memory, as well as a dog clutch of a transmission and corresponding actuator controlled by the instructions and processor based on one or more sensors. For example, the instruction may be configured to carry out a method. The method may comprise locking a shaft of the transmission, positioning the actuator of the transmission at a prescribed position, commanding the electric motor to rotate at a selected speed; and updating an engagement threshold position when the electric machine stalls based on the prescribed position of the actuator. Subsequent operation of the clutch actuator may be adjusted based on the updated engagement threshold learned through such operation.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of prime movers, internal combustion engines, and/or transmissions. The subject matter of the present disclosure includes all novel and non-obvious combinations and sub-combinations of the various systems and configurations, and other features, functions, and/or properties disclosed herein.

Note that the example control and estimation routines included herein can be used with various engine, electric machine, transmission, and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engagement of a dog clutch in an electrified drivetrain, comprising:
   locking a shaft of a transmission;
   positioning an actuator of the transmission at a prescribed position;
   commanding an electric machine to rotate at a selected speed; and
   updating an engagement threshold position when the electric machine stalls based on the prescribed position of the actuator.

2. The method of claim 1, where the actuator actuates to positions along an axis such that a functional clearance is closed in a same direction as another functional clearance that is closed by exploiting an axial force arising from a helix angle of a gear, where the gear may be engaged by the actuator.

3. The method of claim 2, wherein the shaft of the transmission is a driven shaft of the transmission, the method further comprising actuating the actuator responsive to the updated engagement threshold position during a subsequent engagement and/or disengagement.

4. The method of claim 1, where the engagement threshold position, the prescribed position, and a start position are points on an axis and the actuator and components of the dog clutch are shifted in a direction parallel with the axis, wherein the start position is a point the actuator positions a shifting rod and the components of the dog clutch are positioned at before engagement or shifting to the prescribed position to test for the engagement threshold position.

5. The method of claim 4, where a first event or a second event occurs when the actuator is positioned at the prescribed position, wherein during the first event an engaging component shiftingly coupled to the actuator via the shifting rod enters a repulsive zone where a repulsive force is applied to and pushes the actuator toward the start position, and during the second event the shifting rod and the engaging component enter an attractive zone where the actuator is not pushed toward the start position and causes the motor to stall when requested to spin.

6. The method of claim 5, where the repulsive zone comprises a first distance of the axis comprising points at a distance from the start position between a neutral threshold position and the engagement threshold position.

7. The method of claim 6, wherein the attractive zone comprises a second distance of the axis that comprise points at greater distance from the start position than the engagement threshold position.

8. The method of claim 7, where the dog clutch comprises the engaging component, the engaging component is complementary to an engagement component, where the engaging component comprise at least a first tooth and the engaging component comprises at least a second tooth.

9. The method of claim 8, where the engaging component is a sleeve and the engagement component is an engagement ring.

10. The method of claim 9, where the sleeve is an engaging ring.

11. The method of claim 10, where the first tooth comprises at least a first contact edge, a second contact edge, a first leading surface, a first trailing surface, and the second tooth comprises at least a third contact edge, a fourth contact edge, a second leading surface, and a second trailing surface, wherein the first leading surface extends with a first arm a first angle between and the first trailing surface extends with a second arm of a second angle, where the first angle is between 40 degrees and 60 degrees from a centerline and the second angle is between 0 degrees and 20 degrees from the centerline.

12. The method of claim 11, where during the first event the first tooth engages with the second tooth at the neutral threshold position or at the repulsive zone, where at the neutral threshold position the first contact edge is in surface sharing contact with the third contact edge, and at the repulsive zone the position the first leading surface is in surface sharing contact with the second leading surface.

13. The method of claim 11, where during the second event the first tooth engages with the second tooth at the engagement threshold position or at the attractive zone, where at engagement threshold position the second contact edge is in surface sharing contact with the fourth contact edge, and at the attractive zone the first trailing surface is in surface sharing contact with the second trailing surface.

14. A method for estimating a neutral threshold position of a dog clutch, comprising:
   locking a shaft of a transmission;
   positioning an actuator at a prescribed position;
   commanding an electric machine to rotate at a selected speed; and
   updating a neutral threshold position to a first test position when at a second test position the actuator is pushed in a direction opposite to a shift direction along an axis, wherein the shift direction is a direction the actuator shifts to engage the dog clutch, and where the first test position is a last tested position before the second test position.

15. The method of claim 14, where the neutral threshold position, the prescribed position, and a start position are points on the axis that the actuator and components of the dog clutch shift a parallel direction with, wherein the start position is a point the actuator positions a shifting rod and the components of the dog clutch at before shifting to the prescribed position to test for the neutral threshold position.

16. The method of claim 15, where a first event, a second event, or a third event occurs when the actuator is positioned at the prescribed position, during the first event an engaging component of the clutch shiftingly coupled to the actuator enters via the shifting rod a neutral zone and no force is applied to the actuator from an electric machine driving a gear set comprising a gear that is selectively coupled to the dog clutch, and during the second event the shifting rod and the engaging component enter a repulsive zone and a repulsive force is applied to the actuator pushing the actuator toward the start position.

17. The method of claim 16, where for each iteration of the method, the prescribed position is increased by a step size multiplied by a first counter.

18. The method of claim 17, where during the first event the speed and a torque of the electric machine are reduced and the first counter is increased by a factor of one, where during the second event the method ends, where during the third event the step size is decreased and the first counter is reset to zero.

19. A method for estimating a neutral threshold position and an engagement threshold position of a dog clutch, comprising:

locking a driven shaft of a transmission;
positioning an actuator at a first prescribed position;
commanding an electric machine to rotate at a speed; and
updating the first prescribed position of the actuator as the neutral threshold position and calculating a second prescribed position when the actuator is pushed in a direction opposite to a shift direction along an axis, wherein the shift direction is a direction the actuator shifts to engage the dog clutch, and
locking the driven shaft of the transmission;
positioning the actuator at the second prescribed position;
commanding the electric machine to rotate at the speed; and
updating the second prescribed position as the engagement threshold position when the electric machine stalls.

* * * * *